United States Patent
Leclerc et al.

(10) Patent No.: US 7,528,203 B2
(45) Date of Patent: May 5, 2009

(54) CYCLIC OLEFIN COPOLYMERS, AND METHODS OF MAKING THE SAME

(75) Inventors: Margarete K. Leclerc, Mountain View, CA (US); Anne Marie Lapointe, Sunnyvale, CA (US); Cynthia Lee Micklatcher, Hayward, CA (US); Lily Joy Ackerman, San Francisco, CA (US); Mark L. Micklatcher, Hayward, CA (US); Victor O. Nava-Salgado, San Jose, CA (US)

(73) Assignees: ExxonMobil Chemical Patents Inc., Houston, TX (US); Symyx Technologies Inc., Santa Clara, CA (US)

( * ) Notice: Subject to any disclaimer, the term of this patent is extended or adjusted under 35 U.S.C. 154(b) by 41 days.

(21) Appl. No.: 11/891,940

(22) Filed: Aug. 14, 2007

(65) Prior Publication Data

US 2008/0071046 A1    Mar. 20, 2008

Related U.S. Application Data

(60) Provisional application No. 60/844,519, filed on Sep. 14, 2006.

(51) Int. Cl.
    C08F 32/04    (2006.01)
(52) U.S. Cl. .................. 526/308; 526/352; 526/161
(58) Field of Classification Search ................ 526/308, 526/351, 352, 161
    See application file for complete search history.

(56) References Cited

U.S. PATENT DOCUMENTS

| | | | |
|---|---|---|---|
| 5,087,677 A | 2/1992 | Brekner et al. | |
| 5,204,429 A * | 4/1993 | Kaminsky et al. | ........... 526/308 |
| 6,316,560 B1 | 11/2001 | Jacobs et al. | |
| 6,365,686 B1 | 4/2002 | Jacobs et al. | |
| 6,750,345 B2 | 6/2004 | Boussie et al. | |
| 6,794,514 B2 | 9/2004 | Brummer et al. | |
| 6,869,904 B2 | 3/2005 | Boussie et al. | |
| 2005/0107559 A1* | 5/2005 | Coates et al. | ............ 526/348.3 |

FOREIGN PATENT DOCUMENTS

WO    WO 99/50320    7/1999

OTHER PUBLICATIONS

Imanishi et al., Macromol. Symp., 195, 45-62(2003).*
Naga et al., Macromol. Chem. Phys., 203, 159-165 (2002).*
Fujita et al., Macromolecules, 35, 9640-9647(2002).*
Lavoie et al., Chem. Comm., 864-865(2003).*
A.R. Lavoie et al., "Alternating stereospecific copolymerization of cyclopentene and ethylene with constrained geometry catalysts," ChemComm, 2003, pp. 864-865.
A.R. Lavoie et al., "Catalytic syntheses of alternating, stereoregular ethylene/cycloolefin copolymers," Tetrahedron, vol. 60, 2004, pp. 7147-7155.

N.Naga et al., "Copolymerization of Ethylene and Cyclopentene with Zirconocene Catalysts: Effect of Ligand Structure of Zirconocenes," Macromol. Chem. Phys, vol. 203, No. 1, 2002, pp. 159-165.
W.Wang et al., Copolymerization of ethylene with Cyclohexene (CHE) Catalyzed by Nonbridged Half-Titanocenes Containing Aryloxo Ligand: Notable Effect of Both Cyclopentadienyl and Anionic Donor Ligand for Efficient CHE Incorporation, J. Am. Chem. Soc., vol. 127, 2005, pp. 4582-4583.
N.Naga et al., "Crystalline Structure and Thermal Property of Polyethylene and Isotactic Polypropylene Containing Cyclopentane Units in the Main Chain," American Chemical Society, Macromolecules, 2002, vol. 35, pp. 3041-3047.
S.L.Fegade et al., "Cycloolefin copolymers: Engineering polyolefins," Popular Plastics & Packaging, Dec. 2004, pp. 77-84.
F.Garbassi et al., "Engineering Thermoplastics," History of Thermoplastics Development, Kirk-Othmer Encycl. Of Chemical technology, Oct. 18, 2001, pp. 1-5.
W.Kaminsky et al., Homo- and Copolymerization of Cycloolefins by Metallocene Catalysts, Metallocene-based Polyolefins, 2000, pp. 91-113.
F.Garbassi et al., "Engineering Thermoplastics," Hydrocarbon Materials, Kirk-Othmer Encyl. Of Chemical technology, Oct. 18, 2001, pp. 1-5.
A. Jerschow et al., Nuclear Magnetic Resonance Evidence for a New Microstructure in Ethene-Cyclopentene Copolymers, Macromolecules, vol. 28, 1995, pp. 7095-7099.
S.Collins et al., "The Microstructure of Poly(cyclopentene) Produced by Polymerization of Cyclopentene with Homogeneous Ziegler-Natta Catalysts," Amer. Chem. Soc., 1992, pp. 233-237.
W.M.Kelly et al., "Polymerization of Cyclopentene Using Metallocene Catalysts: Competitive Cis- and Trans-1,3 Insertion Mechanisms," Amer. Chem. Society, Macromolecules, 1997, vol. 30, pp. 3151-3158.
W.M.Kelly et al., "Polymerization of Cyclopentene Using Metallocene Catalysts: Polymer Tacticity and Properties," Amer. Chem. Society, Macromolecules, 1994, vol. 27, pp. 4477-4485.
N. Naga, "Simultaneous Wide-Angle X-Ray Diffraction and Differential Scanning Calorimetry Analysis of the Melting and Recrystallization Behavior of Polyethylene and Isotactic Polypropylene Containing Cyclopentane Units in the Main Chain," Jrnl. Of Polymer Science: Part B: Polymer Physics, vol. 42, 2004, pp. 1457-1465.
N.Naga, "Structure of cyclopentene unit in the copolymer with propylene obtained by stereospecific zirconocene catalysts," Polymer, vol. 43, 2002, pp. 2133-2139.

(Continued)

Primary Examiner—Ling-Siu Choi

(57) ABSTRACT

Copolymers of an olefin or alpha-olefin and a cyclic olefin where the cyclic olefin comprises greater than 50 mole percent by weight of the copolymer have been discovered. These copolymers have unique properties, including low density, high chemical resistance, low elongation to break, low shrinkage, good processability, low water absorption and good clarity. The copolymers also may be used as an engineering plastic. A process for making these copolymers is also disclosed, with the process comprising reaction of the olefin or alpha-olefin with the cyclic olefin under polymerization conditions including a catalyst comprising a metal-ligand complex having a bridged bi-phenyl phenol ligand structure.

28 Claims, 2 Drawing Sheets

OTHER PUBLICATIONS

Structure-property relationships, Polymers, Polymer properties and characterization, pp. 35-49.

M. Fujita, "Synthesis and Characterization of Alternating and Multiblock Copolymers from Ethylene and Cyclopentene," Amer. Chem. Society, Macromolecules, vol. 35, 2002, pp. 9640-9647.

Y. Imanishi et al., Synthesis of Polyolefins w/Unique Properties by Using Metallocene-Type Catalysts, Macromolecules Symposium, vol. 195, 2003, pp. 45-62.

"Ticona Brings Production Unit for Topas into Operation," True Milestone, pp. 1-7.

* cited by examiner

US 7,528,203 B2

CYCLIC OLEFIN COPOLYMERS, AND METHODS OF MAKING THE SAME

CROSS REFERENCE TO RELATED APPLICATIONS

This application claims priority to U.S. Provisional Application No. 60/844,519, filed Sep. 14, 2006, the disclosures of which are fully incorporated herein by reference.

FIELD OF THE INVENTION

The present invention relates to copolymers of cyclic olefins, particularly cyclopentene and a second olefin. The invention also relates to methods of polymerization of copolymers of cyclic olefins, such as cyclopentene, and a second olefin with a bridged bi-phenyl phenol catalyst.

BACKGROUND OF THE INVENTION

Cyclic olefin copolymers (COC) are generally known as polymers that include a saturated cyclic moiety as part of the polymer, using monomers such as cyclobutene, cyclopentene, and norbornene (and typically, thus, styrene is not included within the definition of a cyclic olefin). Traditionally COC's are made using Ziegler-Natta polymerization (see U.S. Pat. No. 5,087,677) or, more recently, using metallocene catalysts (see U.S. Pat. No. 6,316,560). The most common type of COC in commercial production is one that incorporates norbornene as the cyclic olefin. Recently, there has been increased interest in copolymers of cyclopentene and other olefins, such as ethylene. Traditional Ziegler-Natta methods and catalysts, and metallocene catalysts, however, have been unable to polymerize cyclopentene and ethylene to produce a polymer having commercially desirable properties in a commercially acceptable process, and in particular have not produced a copolymer of cyclopentene and ethylene having a desirable glass transition temperature (Tg).

The Tg is an important property of cyclic olefin copolymers. Tg allows a measure of whether the material is more or less plastic or rubber, and is believed to reflect the ability of the polymer chain to move in the solid state. Many structural features of a polymer can affect the Tg, including chain flexibility, steric hindrance, side groups (presence, absence and/or size), symmetry, polarity and copolymerization. The Tg of known cyclic olefin copolymers is known to rise, generally, as the mole percent incorporation of the cyclic comonomer increases and lower Tg's result generally when fewer cyclic comonomer units are inserted into the chain. However, the Tg's of cyclic olefin copolymers produced from cyclopentene are generally low (Tg's well below 30° C. are common). See, e.g., LaVoie et al., *Tetrahedron, Vol.* 60 (2004), pp. 7147-7155; Fugita et al., *Macromolecules, Vol.* 35 (2002), pp. 9640-9647. What is needed is a catalyst capable of inserting cyclopentene monomer into the resulting polymer chain at a higher mole percentage than is known.

Ziegler-Natta catalysis, metallocene catalysis or other polymerization methods (e.g., ring opening metathesis) have not produced a cyclic olefin copolymer that includes cyclopentene having a desired microstructure or Tg. For example, metallocene catalysts produce copolymers of cyclopentene and ethylene where the cyclopentene is incorporated with a 1,3 insertion and/or with a low Tg. See Jerschow et al., *Macromolecules,* 1995, Vol. 28, pp. 7095-7099. Also for example, ring-opening metathesis polymerization produces a maximum of 50 mole % cyclopentene in the copolymers, and without direct bonding of the cyclopentene monomers in the product and without a commercially-desirable Tg. See Fugita et al. *Macromolecules,* Vol. 35 (2002) pp. 9640-9647.

Recently, work has been performed on olefin polymerization catalysts that move beyond metallocenes. For example, Symyx scientists have produced a variety of catalysts that do not rely on metallocenes for a variety of polymerization and other processes. See for example U.S. Pat. Nos. 6,869,904; 6,794,514; and 6,750,345. A need exists for a cyclic olefin copolymer with a high Tg made from cyclopentene, and also for such polymers to be prepared with non-cyclopentadienyl based catalysts.

SUMMARY OF THE INVENTION

This invention relates to a polymer produced from cyclopentene and another olefin, preferably having particular properties. The other olefin is generally either ethylene or propylene or a combination thereof. The particular properties generally include greater than 50 mole % cyclopentene in the copolymer. The particular properties also include, in some embodiments, 1,2 insertion of the cyclopentene without substantial 1,3 insertion. The particular properties also typically include, in some embodiments, a Tg of greater than 30° C. The particular properties also typically include, in some embodiments, direct bonding of cyclopentene monomers having 1,2 insertion in the backbone of the copolymer.

In general, in another aspect, the invention provides a method of making copolymers of cyclopentene and another monomer selected from the group consisting of ethylene and propylene and combinations thereof, with the method comprising polymerizing cyclopentene and the other monomer in the presence of a catalyst comprising a composition of ligand and metal precursor or a metal-ligand complex characterized by the formula:

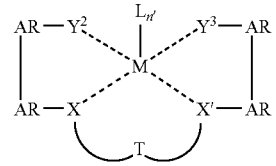

wherein two of the bonds from $Y^2$, $Y^3$, X and X' to M are covalent, with the other bonds being dative; AR is an aromatic group that can be the same or different from the other AR groups with each AR being independently selected from the group consisting of optionally substituted aryl or heteroaryl;

T is a bridging group;

X, X', $Y^2$, and $Y^3$ are independently selected from the group consisting of oxygen and sulfur, optionally substituted alkoxy, aryloxy, alkylthio, arylthio, $—N(R^{30})_r—$, and $—P(R^{30})_r—$, where $R^{30}$ is selected from the group consisting of hydrogen, halogen, and optionally substituted hydrocarbyl, heteroatom-containing hydrocarbyl, silyl, boryl, alkoxy, aryloxy and combinations thereof, and r is 0 or 1;

M is a metal selected from groups 3-6 and lanthanide elements of the periodic table of elements;

each L is independently a moiety that forms a covalent, dative or ionic bond with M; and n' is 1,2, 3 or 4.

T is a bridging group preferably having from one to fifty non-hydrogen atoms. In some embodiments, the bridging group T is selected from the group consisting of optionally substituted divalent hydrocarbyl and divalent heteroatom containing hydrocarbyl. In other embodiments, T is selected from the group consisting of optionally substituted divalent alkyl, alkenyl, alkynyl, heteroalkyl, heteroalkenyl, heteroalkynyl, aryl, heteroaryl and silyl. Specific T groups useful herein include —$(CH_2)_2$—, —$(CH_2)_3$—, —$(CH_2)_4$—, —$(CH_2)$—$(C_6H_4)$—$(CH_2)$—, and —$(CH2)$—$(SiRR')$—$(CH2)$— where R,R' are selected from the group consisting of Me, Et, and alkyl.

The details of one or more embodiments of the invention are set forth in the description below. Other features, objects and advantages of the invention will be apparent from the description and from the claims.

DETAILED DESCRIPTION OF THE INVENTION

Figure 1:
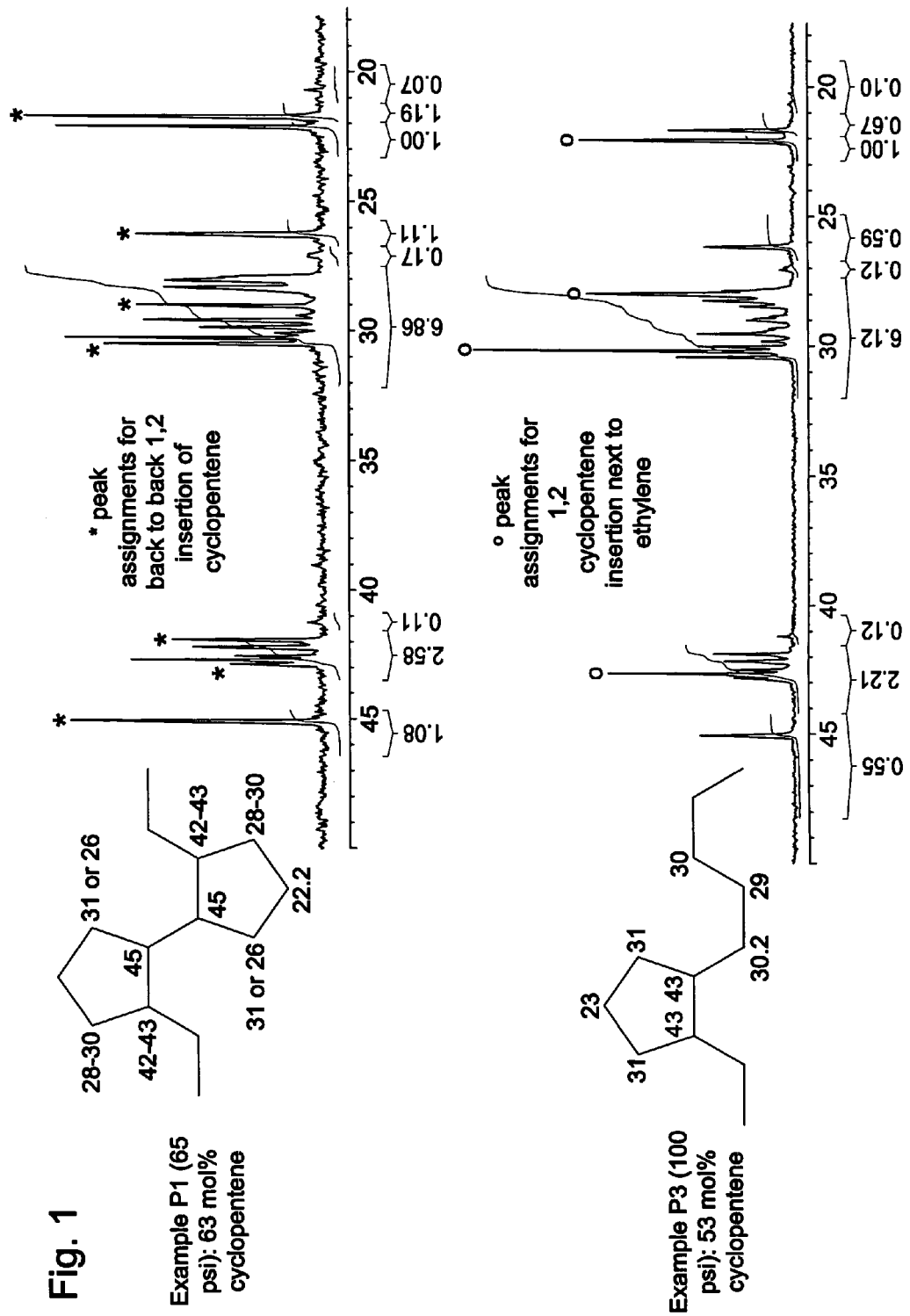
FIG. 1 contains two $^{13}C$ NMR of copolymers of ethylene and cyclopentene in accord with the invention, including peak assignments.

Novel polymers, copolymers or other ordered polymers having unique glass transition temperatures and/or structural properties are disclosed. The polymers of this invention can be described in a variety of different ways or embodiments, which may be combined. More specifically, the invention comprises a copolymer prepared from the monomers of ethylene and cyclopentene, wherein the cyclopentene monomer is incorporated into copolymer backbone generally, in an amount greater than 50 mole percent. In cyclopentene copolymers, the cyclopentene is incorporated into the backbone of the copolymer via a cis 1,2 insertion without substantial 1,3 insertion, preferably simply without 1,3 insertion.

Insertion configuration referred to as cis 1,2 insertion means that the cyclopentene monomer is incorporated into the polymer backbone as shown in formula (I):

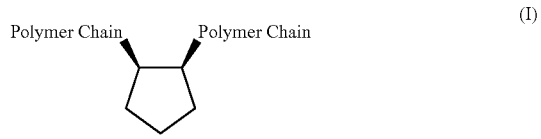

(I)

By way of comparison, insertion configuration referred to as cis or trans 1,3 insertion means that the cyclopentene is incorporated into the polymer backbone as shown in formula (II) (cis 1,3) or formula (III) (trans 1,3):

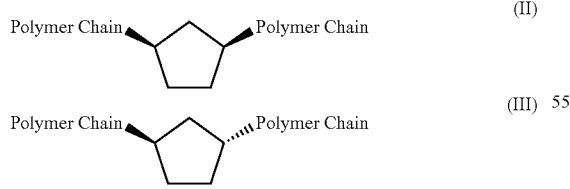

(II)

(III)

Nuclear magnetic resonance ($^{13}C$ NMR) is used to determine whether 1,2 insertion or 1,3 insertion (or both) is present in the polymer as described in Fugita et al. Macromolecules 35(2002) 9640-9647. For purposes of this invention and the claims thereto, 1,3 insertion is characterized in $^{13}C$ NMR by the presence of resonant peaks in the range of about 32 to 41 ppm, and 1,2 insertion is characterized in $^{13}C$ NMR by the presence of resonant peaks in the range of about 42 to 45 ppm.

In this application, the phrase "without any detectable 1,3 insertion" or "without 1,3 insertion" means that within the standard error of a $^{13}C$ NMR experiment one of skill in the art will not see resonant peaks beyond the background noise in the spectrum in the range of about 32 to 41 ppm for a copolymer prepared from cyclopentene and ethylene. Similarly, the phrase "without a substantially detectable amount of 1,3 insertion" means that 1,3 insertion generally cannot be detected above background noise using a Bruker ADVANCE DPX 300 MHz NMR, as described in the examples section where the NMR scan is conducted using a DEPT60 protocol for 3000 scans with a 10 second delay and a 2.55 second acquisition time.

In this application, the phrase "without substantially any 1,3 insertion" means that the amount of 1,3 insertion is less than about 3%, determined using the $^{13}C$ NMR method described above and in the examples section using a Bruker ADVANCE DPX 300 MHz NMR.

Mole percent incorporation of cyclopentene into the copolymer is preferably at least 50%, more specifically at least about 60% and even more specifically at least about 70%. Mole percent incorporation of cyclopentene into the polymer product is determined by Raman spectroscopy using a Jobin Yvon Spectrometer LABRAM 3/2031IM, 1×50 objective, YAG Laser with an acquisition from 100 $cm^{-1}$ to 3450 $cm^{-1}$ or by NMR as described above.

In another embodiment, this invention is directed specifically toward a copolymer of ethylene, propylene or combinations thereof and cyclopentene, where the copolymer has a glass transition temperature of greater than 30° C. In more specific embodiments, the Tg is greater than about 35° C., greater than about 40° C. and even more specifically greater than about 50° C., and even more specifically greater than about 55° C. The glass transition temperature (Tg) is determined using differential scanning calorimetry (DSC) performed on a TA instrument DSC (available from TA Instruments, New Castle, Del.) as shown in the example section below. In another embodiment, Tg can be determined using a parallel dynamic mechanical thermal analysis instrument, such as is disclosed in U.S. Pat. No. 6,679,130, incorporated herein by reference. In the event the Tg measured by the DSC method and the DMTA method are not the same then the Tg measured by the DSC method shall control.

In another embodiment, this invention is directed toward a copolymer of ethylene and cyclopentene, where the cyclopentene monomer is incorporated into the backbone of the copolymer in an amount less than 80 mole percent and with at least two cyclopentene monomers bonded directly to each other into the backbone of the copolymer via a cis 1,2 insertion without 1,3 insertion. This embodiment is directed toward those copolymers where the incorporated cyclopentene monomers are bonded to each other in a manner represented by formula IV:

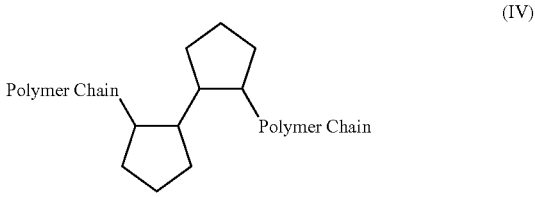

(IV)

It will be apparent to one of skill in the art that a number of stereoconfigurations are possible. Formula (V) depicts an isotactic configuration of cyclopentene units, while formula (VI) depicts a syndiotactic configuration of cyclopentene units.

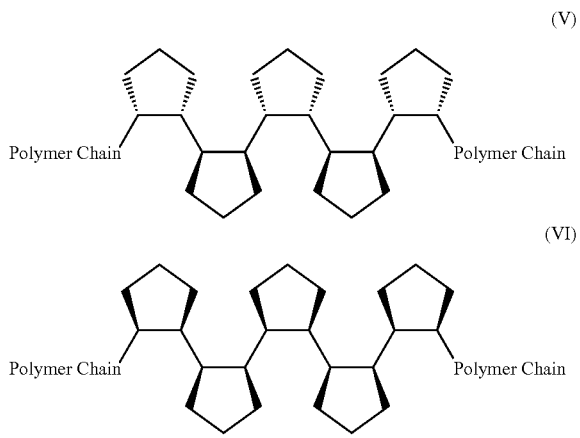

(V)

(VI)

Random, or atactic configurations are also possible. Isotactic, syndiotactic and atactic configurations are within the scope of the invention.

The mole percent of cyclopentene in the copolymer of this embodiment can be lower than about 90%, more specifically lower than about 80% and even more specifically lower than about 70% and still even more specifically lower than about 75%. Further, the mole percent of cyclopentene in the copolymer of this embodiment can be greater than 50 mole % and lower than about 90%, more specifically lower than about 80% and even more specifically lower than about 70% and still even more specifically lower than about 75%. Here, the direct bonding of the cyclopentene monomers in a cis 1,2 configuration provides the ability to get to higher cyclopentene incorporation with higher productivities and higher Tg's than has been known in the past.

In still other embodiments, the ethylene monomer can be replaced (in whole or in part) with propylene. Thus, this invention is also directed toward a copolymer of propylene and cyclopentene, with the cyclopentene monomer incorporated in the backbone of the copolymer in an amount greater than 50 mole percent, and in some embodiments, with the cyclopentene incorporated via a cis 1,2 insertion, generally without substantial 1,3 insertion and preferably without detectable 1,3 insertion. In another embodiment in which the ethylene monomer is replaced with propylene, this invention is directed toward a copolymer of propylene and cyclopentene, with the cyclopentene monomer incorporated in the backbone of the copolymer to produce a copolymer with a Tg greater than about 50° C.

This invention is also directed toward a terpolymer of ethylene, propylene and cyclopentene, wherein the cyclopentene monomer is incorporated in said polymer in an amount greater than 50 mole percent and the remainder of the less than 50 mole percentage of monomer in the polymer is a ratio of ethylene to propylene. The ethylene to propylene ratio can range from 0 to about 99 parts ethylene and from 0 to about 99 parts propylene. Thus, in this embodiment, the remainder of the less than 50 mole percentage of monomer in the polymer is a ratio of ethylene to propylene comprising from 0.1 to 99.9% ethylene and from 0.1 to 99.9% propylene.

In another embodiment in which the ethylene monomer is replaced in part with propylene, this invention is directed toward a terpolymer of ethylene, propylene and cyclopentene, with the cyclopentene monomer incorporated in the backbone of the terpolymer to produce a copolymer with a Tg greater than about 50° C., or more specifically greater that about 70° C.

The novel polymers disclosed herein can be employed alone or with other natural or synthetic polymers in a blend. Such other natural or synthetic polymers can be polyethylene (including linear low density polyethylene, low density polyethylene, high density polyethylene, etc.), atactic polypropylene, nylon, ethylene-propylene-diene monomer rubber, ethylene-propylene elastomer copolymers, polystyrene (including syndiotactic polystryene), ethylene-styrene copolymers and terpolymers of ethylene-styrene and other $C_3$-$C_{20}$ olefins (such as propylene).

The novel copolymers of the present invention are useful for a wide variety of applications, including film for blister packaging (e.g., in the pharmaceutical industry), as a replacement for glass as vials or containers, in medical applications where biocompatibility is an issue, as lenses or windows in printers or video cameras or bar code readers (or other applications where clarity is important) and other applications that will be evident to those of skill in the art. The polymers of the invention can also have low density, high transparency, low birefringence, low water absorption, high rigidity, strength and hardness, good electrical insulation properties and good thermoplastic processability and flowability.

Polymerization preferably is carried out under polymerization conditions including temperatures of from −100° C. to 300° C. and pressures from atmospheric to 3000 atmospheres. Suspension, solution, slurry, gas phase or high-pressure polymerization processes may be employed with the catalysts and compounds of this invention. Such processes can be run in a batch, semi-batch or continuous mode. Examples of such processes are well known in the art. A support for the catalyst may be employed, which may be inorganic (such as alumina, magnesium chloride or silica) or organic (such as a polymer or cross-linked polymer). Methods for the preparation of supported catalysts are known in the art. Slurry, suspension, gas phase and high-pressure processes as known to those skilled in the art may also be used with supported catalysts of the invention.

Other additives that are useful in a polymerization reaction may be employed, such as scavengers, promoters, modifiers and/or chain transfer agents, such as hydrogen, aluminum alkyls and/or silanes.

In a preferred embodiment, a solution process is desirable, with the solution process being run at a temperature above 70° C., more specifically at a temperature above 100° C., still more specifically at a temperature above 110° C. and even more specifically at a temperature above 130° C. Suitable solvents for the solution polymerization are non-coordinating, inert liquids. Examples include straight and branched-chain hydrocarbons such as isobutane, butane, pentane, isopentane, hexane, isohexane, heptane, octane, Isopar-E™ and mixtures thereof; cyclic and alicyclic hydrocarbons such as cyclohexane, cycloheptane, methylcyclohexane, methylcycloheptane, and mixtures thereof; perhalogenated hydrocarbons such as perfluorinated $C_{4-10}$ alkanes, chlorobenzene, and aromatic and alkyl substituted aromatic compounds such as benzene, toluene, mesitylene, and xylene.

As used herein, the phrase "characterized by the formula" is not intended to be limiting and is used in the same way that "comprising" is commonly used. The term "independently selected" is used herein to indicate that the groups in question—e.g., $R^1$, $R^2$, $R^3$, $R^4$, and $R^5$—can be identical or different (e.g., $R^1$, $R^2$, $R^3$, $R^4$, and $R^5$ may all be substituted alkyls, or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. The terms "compound" and "complex" are generally used interchangeably in this specification, but those of skill in the art may recognize certain compounds as complexes and vice versa. For the purposes of illustration, representative certain groups are defined herein. These definitions are intended to supplement and illustrate, not preclude, the definitions known to those of skill in the art.

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 50 carbon atoms, such as methyl, ethyl, n-propyl, isopropyl, n-butyl, isobutyl, sec-butyl, t-butyl, octyl, decyl, and the like, as well as cycloalkyl groups such as cyclopentyl, cyclohexyl and the like. Generally, although again not necessarily, alkyl groups herein may contain 1 to about 12 carbon atoms. "Substituted alkyl" refers to alkyl substituted with one or more substituent groups (e.g., benzyl or chloromethyl), and the terms "heteroatom-containing alkyl" and "heteroalkyl" refer to alkyl in which at least one carbon atom is replaced with a heteroatom (e.g., $—CH_2OCH_3$ is an example of a heteroalkyl).

The term "alkenyl" as used herein refers to a branched or unbranched hydrocarbon group typically although not necessarily containing 2 to about 50 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 50 carbon atoms and at least one triple bond, such as ethynyl, n-propynyl, isopropynyl, n-butynyl, isobutynyl, octynyl, decynyl, and the like. Generally, although again not necessarily, alkynyl groups herein may have 2 to about 12 carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. The term "aryloxy" is used in a similar fashion, and may be represented as —O-aryl, with aryl as defined below. The term "hydroxy" refers to —OH.

Similarly, the term "alkylthio" as used herein intends an alkyl group bound through a single, terminal thioether linkage; that is, an "alkylthio" group may be represented as —S-alkyl where alkyl is as defined above. The term "arylthio" is used similarly, and may be represented as —S-aryl, with aryl as defined below. The term "mercapto" refers to —SH.

The term "allenyl" is used herein in the conventional sense to refer to a molecular segment having the structure $—CH=C=CH_2$. An "allenyl" group may be unsubstituted or substituted with one or more non-hydrogen substituents.

The term "aryl" as used herein, and unless otherwise specified, refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In particular embodiments, aryl substituents have 1 to about 200 carbon atoms, typically 1 to about 50 carbon atoms, and specifically 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom (e.g., rings such as thiophene, pyridine, pyrazine, isoxazole, pyrazole, pyrrole, furan, thiazole, oxazole, imidazole, isothiazole, oxadiazole, triazole, etc. or benzo-fused analogues of these rings, such as indole, carbazole, benzofuran, benzothiophene, etc., are included in the term "heteroaryl"). In some embodiments herein, multi-ring moieties are substituents and in such an embodiment the multi-ring moiety can be attached at an appropriate atom. For example, "naphthyl" can be 1-naphthyl or 2-naphthyl; "anthracenyl" can be 1-anthracenyl, 2-anthracenyl or 9-anthracenyl; and "phenanthrenyl" can be 1-phenanthrenyl, 2-phenanthrenyl, 3-phenanthrenyl, 4-phenanthrenyl or 9-phenanthrenyl.

The terms "halo" and "halogen" are used in the conventional sense to refer to a chloro, bromo, fluoro or iodo substituent.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus, boron or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to hydrocarbyl radicals containing 1 to about 50 carbon atoms, specifically 1 to about 24 carbon atoms, most specifically 1 to about 16 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, specifically one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," and the like, as alluded to in some of the aforementioned definitions, is meant that in the hydrocarbyl, alkyl, aryl or other moiety, at least one hydrogen atom bound to a carbon atom is replaced with one or more substituent groups such as hydroxy, alkoxy, alkylthio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

By "divalent" as in "divalent hydrocarbyl", "divalent alkyl", "divalent aryl" and the like, is meant that the hydrocarbyl, alkyl, aryl or other moiety is bonded at two points to atoms, molecules or moieties with the two bonding points being covalent bonds. The term "aromatic" is used in its usual sense, including unsaturation that is essentially delocalized across multiple bonds, such as around a ring.

As used herein the term "silyl" refers to the —$SiZ^1Z^2Z^3$ radical, where each of $Z^1$, $Z^2$, and $Z^3$ is independently selected from the group consisting of hydrogen and optionally substituted alkyl, alkenyl, alkynyl, heteroatom-containing alkyl, heteroatom-containing alkenyl, heteroatom-containing alkynyl, aryl, heteroaryl, alkoxy, aryloxy, amino, silyl and combinations thereof.

As used herein the term "boryl" refers to the —$BZ^1Z^2$ group, where each of $Z^1$ and $Z^2$ is as defined above. As used herein, the term "phosphino" refers to the group —$PZ^1Z^2$, where each of $Z^1$ and $Z^2$ is as defined above. As used herein, the term "phosphine" refers to the group :$PZ^1Z^2Z^3$, where each of $Z^1$, $Z^3$ and $Z^2$ is as defined above. The term "amino" is used herein to refer to the group —$NZ^1Z^2$, where each of $Z^1$ and $Z^2$ is as defined above. The term "amine" is used herein to refer to the group :$NZ^1Z^2Z^3$, where each of $Z^1$, $Z^2$ and $Z^3$ is as defined above.

The term "saturated" refers to lack of double and triple bonds between atoms of a radical group such as ethyl, cyclohexyl, pyrrolidinyl, and the like. The term "unsaturated" refers to the presence of one or more double and triple bonds between atoms of a radical group such as vinyl, allyl, acetylide, oxazolinyl, cyclohexenyl, acetyl and the like.

Other abbreviations used herein include: "Pr" or "i-Pr" to refer to isopropyl; "Bu" or "t-Bu" to refer to tertiary butyl; "Me" to refer to methyl; "Et" to refer to ethyl; "Ph" refers to phenyl; "Np" refers to napthyl; "Cbz" refers to carbazole; "Cbz-H" refers to carbazole; "Ant" refers to anthracenyl; "H$_8$-Ant" refers to 1,2,3,4,5,6,7,8-octahydroanthracenyl; "THF" refers to tetrahydrofuran, "DIEA" refers to diisopropylethyl amine; "DMF" refers to dimethylformamide; "n-Bu" refers to n-butyl; "NMP" refers to N-methylpyrrolidone; "TLC" refers to thin layer chromatography; "EtOAc" refers to ethyl acetate; and "bz" refers to benzyl.

Catalysts

Catalysts useful in the practice of this invention are a combination of a metal complex and an activator or activating technique. The ligands and metal complexes can be prepared using known procedures, such as those disclosed in U.S. Pat. No. 6,869,904, incorporated herein by reference. See also March, Advanced Organic Chemistry, Wiley, New York 1992 (4$^{th}$ Ed.). Specifically, the ligands can be prepared using a variety of synthetic routes, depending on the variation desired in the ligand. In general, the ligands are prepared in a convergent approach by preparing building blocks that are then linked together either directly or with a bridging group. Variations in the R group substituents can be introduced in the synthesis of the building blocks. Variations in the bridge can be introduced with the synthesis of the bridging group.

The catalysts used in the process of this invention can include a composition of ligand and metal precursor or a metal complex such as are disclosed in U.S. Pat. No. 6,869,904 and PCT/US2005/014670, both of which are incorporated herein by reference. In general, the metal complex is characterized by the general formula:

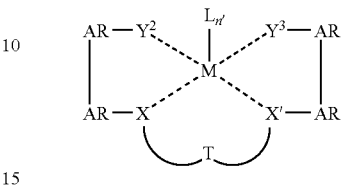

wherein two of the bonds from $Y^2$, $Y^3$, X and X' to M are covalent, with the other bonds being dative;

AR is an aromatic group that can be the same or different from the other AR groups with each AR being independently selected from the group consisting of optionally substituted aryl or heteroaryl;

T is a bridging group;

X, X', $Y^2$, and $Y^3$ are independently selected from the group consisting of oxygen and sulfur, optionally substituted alkoxy, aryloxy, alkylthio, arylthio, —N($R^{30}$)$_r$—, and —P($R^{30}$)$_r$—, where $R^{30}$ is selected from the group consisting of hydrogen, halogen, and optionally substituted hydrocarbyl, heteroatom-containing hydrocarbyl, silyl, boryl, alkoxy, aryloxy and combinations thereof, and r is 0 or 1 (preferably X, X', $Y^2$, and $Y^3$ are independently, oxygen or sulfur, preferably oxygen, preferably all of X, X', $Y^2$, and $Y^3$ are oxygen);

M is a metal selected from groups 3-6 and lanthanide elements of the periodic table of elements, preferably titanium, hafnium or zirconium;

each L is independently a moiety that forms a covalent, dative or ionic bond with M, preferably L is independently selected from the group consisting of halide (F, Cl, Br, I), optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, thioxy, alkylthio, arylthio, hydrido, allyl, diene, phosphine, carboxylates, 1,3-dionates, oxalates, carbonates, nitrates, sulphates, ethers, thioethers and combinations thereof; L may also be ionically bonded to the metal M and for example, L may be a non-coordinated or loosely coordinated or weakly coordinated anion (e.g., L may be selected from the group consisting of those anions described below in the conjunction with the activators), see Marks et al., Chem. Rev. 2000, 100, 1391-1434 for a detailed discussion of these weak interactions; and optionally two or more L groups may be linked together in a ring structure; and n' is 1,2, 3 or 4.

T is preferably a bridging group having from one to fifty non-hydrogen atoms. In some embodiments, the bridging group T is selected from the group consisting of optionally substituted divalent hydrocarbyl and divalent heteroatom containing hydrocarbyl. In other embodiments, T is selected from the group consisting of optionally substituted divalent alkyl, alkenyl, alkynyl, heteroalkyl, heteroalkenyl, heteroalkynyl, aryl, heteroaryl and silyl. Specific T groups useful herein include —(CH$_2$)$_2$—, —(CH$_2$)$_3$—, —(CH$_2$)$_4$—, —(CH$_2$)—(C$_6$H$_4$)—(CH$_2$)—, and —(CH2)—(SiRR')—(CH2) where R,R' are selected from the group consisting of Me, Et, and alkyl. Other useful specific bridging moieties are set forth in the example ligands and complexes herein.

In composition form, the ligand is generally characterized by the general formula:

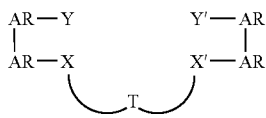

where AR, T, X and X' are as defined above and Y and Y' are independently selected from the group consisting of oxygen and sulfur, optionally substituted alkoxy, aryloxy, alkylthio, arylthio, $-N(R^{30})_r-$, and $-P(R^{30})_r-$, where $R^{30}$ is selected from the group consisting of hydrogen, halogen, and optionally substituted hydrocarbyl, heteroatom-containing hydrocarbyl, silyl, boryl, alkoxy, aryloxy and combinations thereof, and r is 0 or 1 (preferably Y and Y' are independently, oxygen or sulfur, preferably oxygen, preferably both of Y and Y' are oxygen). Preferably each ligand has at least two hydrogen atoms capable of removal in a binding reaction with a metal atom or metal precursor or base; and in some embodiments, prior to such a complexation reaction, a base may be reacted with the ligand to form a salt, the product of which may then be reacted with a metal precursor.

The metal precursor is generally characterized by the formula $M(L)_n$ where M is a metal selected from the group consisting of groups 3-6 and Lanthanide elements of the Periodic Table of Elements (preferably Group 4, preferably zirconium, hafnuim or titanium); n is 1, 2, 3, 4, 5, or 6; and L is independently selected from the group consisting of halide (F, Cl, Br, I), optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, thioxy, alkylthio, arylthio, hydrido, allyl, diene, phosphine, carboxylates, 1,3-dionates, oxalates, carbonates, nitrates, sulphates, ethers, thioethers and combinations thereof, L may also be ionically bonded to the metal M and for example, L may be a non-coordinated or loosely coordinated or weakly coordinated anion (e.g., L may be selected from the group consisting of those anions described below in the conjunction with the activators), see Marks et al., *Chem. Rev.* 2000, 100, 1391-1434 for a detailed discussion of these weak interactions; and optionally two or more L groups may be linked together in a ring structure.

In some embodiments, the group X-T-X' is selected from the group consisting of

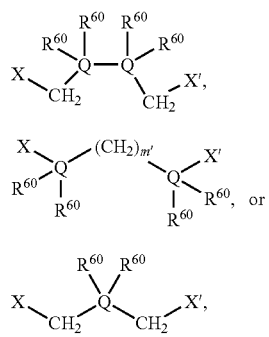

wherein X and X' are as defined above, each Q is independently selected from the group consisting of carbon and silicon, m' is 0, 1, or 2; and each $R^{60}$ is independently selected from the group consisting of hydrogen and optionally substituted hydrocarbyl and heteroatom containing hydrocarbyl, wherein the $R^{60}$ substituents are optionally joined into a ring structure having from 3 to 50 atoms in the ring structure not counting hydrogen atoms, provided that at least one $R^{60}$ substituent is not hydrogen; and provided that when X-T-X' is selected from formula (b) at least one $R^{60}$ substituent on each Q is not hydrogen.

In other embodiments, T is represented by the general formula $-(Q''R^{40}_{2-z''})_{z'}-$ wherein each Q'' is independently either carbon or silicon and where each $R^{40}$ is independently selected from the group consisting of hydrogen and optionally substituted hydrocarbyl or heteroatom-containing hydrocarbyl, provided that two or more $R^{40}$ groups may be joined into a ring structure having from 3 to 50 atoms in the ring structure (not counting hydrogen atoms); z' is an integer from 1 to 10, more specifically from 1 to 5 and even more specifically from 2-5, and z'' is 0, 1 or 2. For example, when z'' is 2, there is no $R^{40}$ group associated with Q'', which allows for those cases where one Q'' is multiply bonded to a second Q''. In more specific embodiments, $R^{40}$ is selected from the group consisting of hydrogen, halogen, and optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, alkylthio, arylthio, and combinations thereof, where at least one $R^{40}$ group in T is not hydrogen.

In some embodiments of the processes of this invention, the metal-ligand complexes used in this invention may be characterized by the general formula:

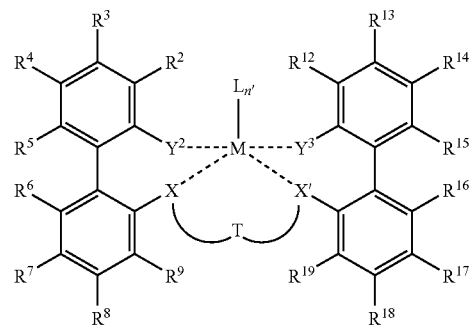

wherein L, M, n', and T, are as defined above, and each of $R^2$, $R^3$, $R^4$, $R^5$, $R^6$, $R^7$, $R^8$, $R^9$, $R^{12}$, $R^{13}$, $R^{14}$, $R^{15}$, $R^{16}$, $R^{17}$, $R^{18}$, and $R^{19}$ is independently selected from the group consisting of hydrogen, halogen, and optionally substituted hydrocarbyl, heteroatom-containing hydrocarbyl, alkoxy, aryloxy, silyl, boryl, phosphino, amino, alkylthio, arylthio, nitro, and combinations thereof; optionally two or more R groups can combine together into ring structures (for example, single ring or multiple ring structures), with such ring structures having from 3 to 12 non-hydrogen atoms in the ring; X and X' and $Y^2$ and $Y^3$ are as defined above, provided that each of $Y^2$ and $Y^3$ includes a labile hydrogen. In particular embodiments $Y^2$ and $Y^3$ are OH or SH. The dotted lines indicate possible binding to the metal atom, provided that at least two of the dotted lines are covalent bonds. In some embodiments, the choice of one or more of X, X', $Y^2$, $Y^3$, $R^2$, $R^{12}$ and T has an influence on the stereoconfiguration of the cyclopentene copolymers produced. More particularly, in some embodiments the size and identity of the substituents on the AR-$Y^2$ and AR-Y³, such as the R² and/or R¹², has an influence on the copolymer tacticity allowing for a range of cyclopentene copolymers to be prepared with desired properties.

The ligands, complexes or catalysts may be supported on organic or inorganic supports. Suitable supports include silicas, aluminas, clays, zeolites, magnesium chloride, polystyrenes, substituted polystyrenes and the like. Polymeric supports may be cross-linked or not. Similarly, the ligands, complexes or catalysts may be supported on supports known to those of skill in the art. See for example, Hlalky, *Chem. Rev.* 2000, 100, 1347-1376 and Fink et al., *Chem. Rev.* 2000, 100, 1377-1390, both of which are incorporated herein by reference.

Activators

The metal-ligand complexes and compositions are active catalysts typically in combination with a suitable activator, combination of activators, activating technique or activating package, although some of the ligand-metal complexes may be active without an activator or activating technique depending on the ligand-metal complex and on the process being catalyzed. Broadly, the activator(s) may comprise alumoxanes, Lewis acids, Bronsted acids, compatible non-interfering activators and combinations of the foregoing. These types of activators have been taught for use with different compositions or metal complexes in the following references, which are hereby incorporated by reference in their entirety: U.S. Pat. Nos. 5,599,761, 5,616,664, 5,453,410, 5,153,157, 5,064,802, EP-A-277,004 and Marks et al., *Chem. Rev.* 2000, 100, 1391-1434. In some embodiments, ionic or ion forming activators are preferred. In other embodiments, alumoxane activators are preferred.

In one embodiment, alumoxane activators are utilized as an activator in the catalyst composition useful in the invention. Alumoxanes are generally oligomeric compounds containing —Al(R¹)—O— sub-units, where R¹ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

The activator compounds comprising Lewis-acid activators and in particular alumoxanes are represented by the following general formulae:

  (11)

  (12)

  (13)

An alumoxane is generally a mixture of both the linear and cyclic compounds. In the general alumoxane formula, R³, R⁴, R⁵ and R⁶ are, independently a $C_1$-$C_{30}$ alkyl radical, for example, methyl, ethyl, propyl, butyl, pentyl, hexyl, heptyl, octyl, nonyl, decyl, and "p" is an integer from 1 to about 50. Most preferably, R³, R⁴, R⁵ and R⁶ are each methyl and "p" is a least 4. When an alkyl aluminum halide or alkoxide is employed in the preparation of the alumoxane, one or more $R^{3-6}$ groups may be halide or alkoxide. M' is a metal or metalloid, and Q' is a partially or fully fluorinated hydrocarbyl.

It is recognized that alumoxane is not a discrete material. A typical alumoxane will contain free trisubstituted or trialkyl aluminum, bound trisubstituted or trialkyl aluminum, and alumoxane molecules of varying degree of oligomerization. Those methylalumoxanes most preferred contain lower levels of trimethylaluminum. Lower levels of trimethylaluminum can be achieved by reaction of the trimethylaluminum with a Lewis base or by vacuum distillation of the trimethylaluminum or by any other means known in the art. It is also recognized that after reaction with the transition metal compound, some alumoxane molecules are in the anionic form as represented by the anion in equations 4-6, thus for our purposes are considered "non-coordinating" anions.

For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0594218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

Suitable ion forming compounds useful as an activator in one embodiment comprise a cation that is a Bronsted acid capable of donating a proton, and an inert, compatible, non-interfering, anion, A⁻. Suitable anions include, but are not limited to, those containing a single coordination complex comprising a charge-bearing metal or metalloid core. Mechanistically, the anion should be sufficiently labile to be displaced by olefinic, diolefinic and unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions that comprise coordination complexes containing a single metal or metalloid atom are well known and many, particularly such compounds containing a single boron atom in the anion portion, are available commercially.

Specifically, such activators may be represented by the following general formula:

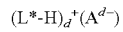

wherein L* is a neutral Lewis base; (L*-H)⁺ is a Bronsted acid; $A^{d-}$ is a non-interfering, compatible anion having a charge of d−, and d is an integer from 1 to 3. More specifically $A^{d-}$ corresponds to the formula: $(M'^{3+}Q_h)^{d-}$ wherein h is an integer from 4 to 6; h−3=d; M' is an element selected from group 13 of the periodic table; and Q is independently selected from the group consisting of hydrogen, dialkylamido, halogen, alkoxy, aryloxy, hydrocarbyl, and substituted-hydrocarbyl radicals (including halogen substituted hydrocarbyl, such as perhalogenated hydrocarbyl radicals), said Q having up to 20 carbon atoms. In a more specific embodiment, d is one, i.e., the counter ion has a single negative charge and corresponds to the formula $A^-$.

Useful activators comprising boron or aluminum can be represented by the following general formula:

$$(L^*-H)^+(M''Q_4)^-$$

wherein: L* is a neutral Lewis base; (L*-H)⁺ is a Bronsted acid; M'' is boron or aluminum; and Q is a fluorinated $C_{1-20}$ hydrocarbyl group. Most specifically, Q is independently selected from the group consisting of fluorinated aryl group, such as a pentafluorophenyl group (i.e., a $C_6F_5$ group) or a 3,5-bis(CF$_3$)$_2$C$_6$H$_3$ group.

Illustrative, but not limiting, examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethylanilinium tetra-(3,5-bis(trifluoromethyl)phenyl)borate, N,N-dimethyl-(2,4,6-trimethylanilinium) tetraphenylborate, trimethylammonium tetrakis(pentafluorophenyl) borate, triethylammonium tetrakis(pentafluorophenyl) borate, tripropylammonium tetrakis(pentafluorophenyl) borate, tri (n-butyl)ammonium tetrakis(pentafluorophenyl) borate, tri (secbutyl)ammonium tetrakis(pentafluorophenyl) borate, N,N-dimethylanilinium tetrakis(pentafluorophenyl) borate, N,N-diethylanilinium tetrakis(pentafluorophenyl) borate, N,N-dimethyl-(2,4,6-trimethylanilinium) tetrakis(pentafluorophenyl) borate, trimethylammonium tetrakis-(2,3,4,6-tetrafluorophenylborate and N,N-dimethylanilinium tetrakis-(2,3,4,6-tetrafluorophenyl) borate; dialkyl ammonium salts such as: di-(i-propyl)ammonium tetrakis(pentafluorophenyl) borate, and dicyclohexylammonium tetrakis(pentafluorophenyl) borate; and tri-substituted phosphonium salts such as: triphenylphosphonium tetrakis(pentafluorophenyl) borate, tri (o-tolyl)phosphonium tetrakis(pentafluorophenyl) borate, and tri(2,6-dimethylphenyl)phosphonium tetrakis(pentafluorophenyl) borate; N,N-dimethylanilinium tetrakis(3,5-bis (trifluoromethyl)phenyl)borate; HNMe(C$_{18}$H$_{37}$)$_2$⁺B(C$_6$F$_5$)$_4$⁻; HNPh(C$_{18}$H$_{37}$)$_2$⁺B(C$_6$F$_5$)$_4$⁻ and ((4-nBu-Ph)NH(n-hexyl)$_2$)⁺B(C$_6$F$_5$)$_4$⁻ and ((4-nBu-Ph)NH(n-decyl)$_2$)⁺B (C$_6$F$_5$)$_4$⁻. Specific (L*-H)⁺ cations are N,N-dialkylanilinium cations, such as HNMe$_2$Ph⁺, substituted N,N-dialkylanilinium cations, such as (4-nBu-C$_6$H$_4$)NH(n-C$_6$H$_{13}$)$_2$⁺ and (4-nBu-C$_6$H$_4$)NH(n-C$_{10}$H$_{21}$)$_2$⁺ and HNMe(C$_{18}$H$_{37}$)$_2$⁺. Specific examples of anions are tetrakis(3,5-bis(trifluoromethyl) phenyl)borate and tetrakis(pentafluorophenyl)borate. In some embodiments, the specific activator is PhNMe$_2$H⁺B (C$_6$F$_5$)$_4$⁻.

Other suitable ion forming activators comprise a salt of a cationic oxidizing agent and a non-interfering, compatible anion represented by the formula:

$$(Ox^{e+})_d(A^{d-})_e$$

wherein: $Ox^{e+}$ is a cationic oxidizing agent having a charge of e+; e is an integer from 1 to 3; and $A^{d-}$, and d are as previously defined. Examples of cationic oxidizing agents include: ferrocenium, hydrocarbyl-substituted ferrocenium, Ag⁺, or Pb⁺². Specific embodiments of $A^{d-}$ are those anions previously defined with respect to the Bronsted acid containing activating cocatalysts, especially tetrakis(pentafluorophenyl) borate.

Another suitable ion forming, activating cocatalyst comprises a compound that is a salt of a carbenium ion or silyl cation and a non-interfering, compatible anion represented by the formula:

$$(C^*)^+A^-$$

wherein: (C*)⁺ is a $C_{1-100}$ carbenium ion or silyl cation; and $A^-$ is as previously defined. A preferred carbenium ion is the trityl cation, i.e. triphenylcarbenium. The silyl cation may be characterized by the formula $Z^4Z^5Z^6Si^+$ cation, where each of $Z^4$, $Z^5$, and $Z^6$ is independently selected from the group consisting of hydrogen, halogen, and optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, mercapto, alkylthio, arylthio, and combinations thereof. In some embodiments, a specified activator is Ph$_3$C⁺ B(C$_6$F$_5$)$_4$⁻.

Other suitable activating cocatalysts comprise a compound that is a salt, which is represented by the formula $(A^{*+a})_b$ $(Z^*J^*_j)^{-c}_d$ wherein A* is a cation of charge +a; Z* is an anion group of from 1 to 50, specifically 1 to 30 non-hydrogen atoms, further containing two or more Lewis base sites; J* independently each occurrence is a Lewis acid coordinated to at least one Lewis base site of Z*, and optionally two or more such J* groups may be joined together in a moiety having multiple Lewis acidic functionality; j is a number from 2 to 12; and a, b, c, and d are integers from 1 to 3, with the proviso that a×b is equal to c×d. See WO 99/42467, which is incorporated herein by reference. In other embodiments, the anion portion of these activating cocatalysts may be characterized by the formula $((C_6F_5)_3M''''-LN-M''''(C_6F_5)_3)^-$ where M'''' is boron or aluminum and LN is a linking group, which is specifically selected from the group consisting of cyanide, azide, dicyanamide and imidazolide. The cation portion is specifically a quaternary amine. See, e.g., LaPointe, et al., *J. Am. Chem. Soc.* 2000, 122, 9560-9561, which is incorporated herein by reference.

In addition, suitable activators include Lewis acids, such as those selected from the group consisting of tris(aryl)boranes, tris(substituted aryl)boranes, tris(aryl)alanes, tris(substituted aryl)alanes, including activators such as tris(pentafluorophenyl)borane. Other useful ion forming Lewis acids include those having two or more Lewis acidic sites, such as those described in WO 99/06413 or Piers, et al., *J. Am. Chem. Soc.*, 1999, 121, 3244-3245, both of which are incorporated herein by reference. Other useful Lewis acids will be evident to those of skill in the art. In general, the group of Lewis acid activators is within the group of ion forming activators (although exceptions to this general rule can be found) and the group tends to exclude the group 13 reagents listed below. Combinations of ion forming activators may be used.

Other general activators or compounds useful in a polymerization reaction may be used. These compounds may be activators in some contexts, but may also serve other functions in the polymerization system, such as alkylating a metal center or scavenging impurities. These compounds are within the general definition of "activator," but are not considered herein to be ion-forming activators. These compounds include a group 13 reagent that may be characterized by the formula:

$$G^{13}R^{50}{}_{3-p}D_p$$

where $G^{13}$ is selected from the group consisting of B, Al, Ga, In and combinations thereof, p is 0, 1 or 2, each $R^{50}$ is independently selected from the group consisting of hydrogen, halogen, and optionally substituted alkyl, alkenyl, alkynyl, heteroalkyl, heteroalkenyl, heteroalkynyl, aryl, heteroaryl, and combinations thereof, and each D is independently selected from the group consisting of halogen, hydrogen, alkoxy, aryloxy, amino, mercapto, alkylthio, arylthio, phosphino and combinations thereof. In other embodiments, the group 13 activator is an oligomeric or polymeric alumoxane compound, such as methylalumoxane and the known modifications thereof. See, for example, Barron, "*Alkylalumoxanes, Synthesis, Structure and Reactivity*", pp. 33-67 in *Metallocene-Based Polyolefins: Preparation, Properties and Technology*, J. Schiers and W. Kaminsky (eds.), Wiley Series in Polymer Science, John Wiley & Sons Ltd., Chichester, England, 2000, and references cited therein. In other embodiments, a divalent metal reagent may be used that is defined by the general formula $M'R^{50}{}_{2-p'}D_{p'}$ and p' is 0 or 1 in this embodiment and $R^{50}$ and D are as defined above. M' is the metal and is selected from the group consisting of Mg, Ca, Sr, Ba, Zn, Cd and combinations thereof. In still other embodiments, an alkali metal reagent may be used that is defined by the general formula $M'^{iv}R^{50}$ and in this embodiment $R^{50}$ is as defined above. $M'^{iv}$ is the alkali metal and is selected from the group consisting of Li, Na, K, Rb, Cs and combinations thereof. Additionally, hydrogen and/or silanes may be used in the catalytic composition or added to the polymerization system. Silanes may be characterized by the formula $SiR^{50}{}_{4-q}D_q$ where $R^{50}$ is defined as above, q is 1, 2, 3 or 4 and D is as defined above, with the proviso that there is at least one D that is a hydrogen.

The molar ratio of metal:activator (whether a composition or complex is employed as a catalyst) employed specifically ranges from 1:10,000 to 100:1, more specifically from 1:5000 to 10:1, most specifically from 1:10 to 1:1. In one embodiment of the invention mixtures of the above compounds are used, particularly a combination of a group 13 reagent and an ion-forming activator. The molar ratio of group 13 reagent to ion-forming activator is specifically from 1:10,000 to 1000:1, more specifically from 1:5000 to 100:1, most specifically from 1:100 to 100:1. In another embodiment, the ion forming activators are combined with a group 13 reagent. Another embodiment is a combination of the above compounds having about 1 equivalent of an optionally substituted N,N-dialkylanilinium tetrakis(pentafluorophenyl) borate, and 5-30 equivalents of a group 13 reagent. In some embodiments from about 30 to 2000 equivalents of an oligomeric or polymeric alumoxane activator, such as a modified alumoxane (e.g., alkylalumoxane), can be used.

In another embodiment, this invention relates to:

1. A copolymer comprising ethylene and cyclopentene or a copolymer comprising propylene and cyclopentene wherein the cyclopentene monomer that is incorporated into the copolymer is present in an amount greater than 50 mole percent, and wherein the cyclopentene is incorporated into the backbone of the copolymer via a cis 1,2 insertion without substantially any 1,3 insertion.

2. A copolymer comprising ethylene and cyclopentene or a copolymer comprising propylene and cyclopentene wherein the cyclopentene monomer that is incorporated into the copolymer is present in an amount greater than 50 mole percent, and the cyclopentene is incorporated into the backbone of the copolymer via a cis 1,2 insertion without 1,3 insertion.

3. A copolymer comprising ethylene and cyclopentene or a copolymer comprising propylene and cyclopentene wherein the cyclopentene monomer is incorporated into the copolymer in an amount less than 80 mole percent, and wherein at least two of the cyclopentene monomers are bonded directly to each other into the backbone of the copolymer via a cis 1,2 insertion without substantially any 1,3 insertion.

4. A copolymer comprising ethylene and cyclopentene or a copolymer comprising propylene and cyclopentene wherein the cyclopentene monomer is incorporated into the copolymer in an amount less than 80 mole percent, and wherein at least two of the cyclopentene monomers are bonded directly to each other into the backbone of the copolymer via a cis 1,2 insertion without 1,3 insertion.

5. A terpolymer of ethylene, propylene and cyclopentene, wherein the cyclopentene monomer that is incorporated into the copolymer is present in an amount greater than 50 mole percent, and wherein the cyclopentene is incorporated into the backbone of the copolymer via a cis 1,2 insertion without substantially any 1,3 insertion.

6. A terpolymer of ethylene, propylene and cyclopentene, wherein the cyclopentene monomer that is incorporated into the copolymer is present in an amount greater than 50 mole percent, and wherein the cyclopentene is incorporated into the backbone of the copolymer via a cis 1,2 insertion without 1,3 insertion.

7. The copolymer of paragraph 1, 2, 3, 4, 5, or 6 wherein less than 3 percent of the cyclopentene is incorporated into the copolymer via 1,3 insertion, preferably less than 10 percent, preferably less than 50 percent, preferably less than 70 percent of the cyclopentene is incorporated into the copolymer via 1,3 insertion.

8. The copolymer of paragraph 1, 2, 3, 4, 5, 6, or 7 wherein the copolymer has a glass transition temperature of greater than 30° C., preferably greater than 35° C., preferably greater than 40° C. preferably greater than 45° C., preferably greater than 50° C., preferably greater than 55° C., preferably greater than 60° C.

9. A method to produce a copolymer of (i) either ethylene or propylene or combinations thereof and (ii) cyclopentene, or the copolymer of any of paragraph 1 to 8 comprising reacting the monomers recited in (i) and (ii) in the presence of a catalyst under conditions sufficient to yield the copolymer, wherein the catalyst is made from one or more activators and a metal complex characterized by the general formula:

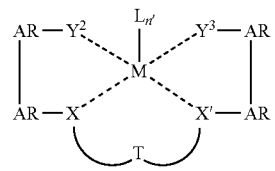

wherein at least two of the bonds from $Y^2$, $Y^3$, X and X' to M are covalent, with the other bonds being dative;

AR is an aromatic group that can be the same or different from the other AR groups with each AR being independently selected from the group consisting of optionally substituted aryl or heteroaryl;

X, X', Y², and Y³ are independently selected from the group consisting of oxygen, sulfur, —N(R³⁰)$_r$—, and P(R³⁰)$_r$—, and optionally substituted alkoxy, aryloxy, alkylthio, and arylthio (preferably X, X', Y², and Y³ are independently, oxygen or sulfur, preferably oxygen, preferably all of X, X', Y², and Y³ are oxygen), where R³⁰ is selected from the group consisting of hydrogen, halogen, and optionally substituted hydrocarbyl, heteroatom-containing hydrocarbyl, silyl, boryl, alkoxy, aryloxy and combinations thereof, and r is 0 or 1;

T is a bridging group, preferably having from one to fifty non-hydrogen atoms, more preferably T is selected from the group consisting of optionally substituted divalent hydrocarbyl and divalent heteroatom containing hydrocarbyl, more preferably T is selected from the group consisting of optionally substituted divalent alkyl, alkenyl, alkynyl, heteroalkyl, heteroalkenyl, heteroalkynyl, aryl, heteroaryl and silyl;

M is a metal selected from groups 3-6 and lanthanide elements of the periodic table of elements (preferably Group 4, preferably zirconium, hafnium or titanium); and each L is independently a moiety that forms a covalent, dative or ionic bond with M, preferably L is independently selected from the group consisting of halide (F, Cl, Br, I), optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, thioxy, alkylthio, arylthio, hydrido, allyl, diene, phosphine, carboxylates, 1,3-dionates, oxalates, carbonates, nitrates, sulphates, ethers, thioethers and combinations thereof; L may also be ionically bonded to the metal M and for example, L may be a non-coordinated or loosely coordinated or weakly coordinated anion (e.g., L may be selected from the group consisting of those anions described below in the conjunction with the activators), see Marks et al., Chem. Rev. 2000, 100, 1391-1434 for a detailed discussion of these weak interactions; and optionally two or more L groups may be linked together in a ring structure; and n' is 1, 2, 3 or 4.

10. The method of paragraph 9 wherein the metal complex is characterized by the general formula:

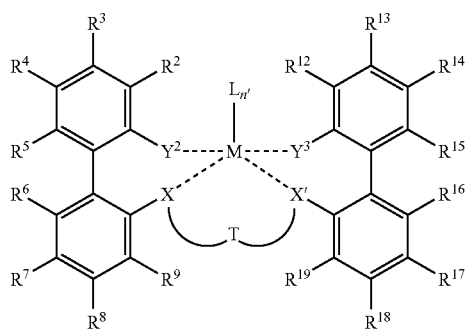

wherein M, L, T, n', X, X', Y² and Y³ are as defined in paragraph 9, and each of R², R³, R⁴, R⁵, R⁶, R⁷, R⁸, R⁹, R¹², R¹³, R¹⁴, R¹⁵, R¹⁶, R¹⁷, R¹⁸, and R¹⁹ is independently selected from the group consisting of hydrogen, halogen, nitro, and optionally substituted hydrocarbyl, heteroatom-containing hydrocarbyl, alkoxy, aryloxy, silyl, boryl, phosphino, amino, alkylthio, arylthio, and combinations thereof; optionally two or more R groups can combine together into ring structures, with such ring structures having from 3 to 100 atoms in the ring not counting hydrogen atoms.

11. The method of paragraph 9 or 10, wherein the group X-T-X' is selected from the group consisting of

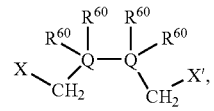
(a)

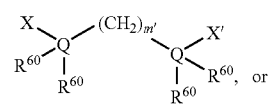
(b)

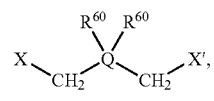
(c)

wherein each Q is independently selected from the group consisting of carbon and silicon, each R⁶⁰ is independently selected from the group consisting of hydrogen and optionally substituted hydrocarbyl and heteroatom containing hydrocarbyl, wherein the R⁶⁰ substituents are optionally joined into a ring structure having from 3 to 50 atoms in the ring structure not counting hydrogen atoms, and m' is 0, 1, or 2; provided that at least one R⁶⁰ substituent is not hydrogen; and provided that when X-T-X' is selected from formula (b) at least one R⁶⁰ substituent on each Q is not hydrogen.

12. The method of paragraph 9 or 10, wherein T is represented by the general formula: —(Q''R⁴⁰$_{2-z''}$)$_{z'}$— wherein each Q'' is independently either carbon or silicon and where each R⁴⁰ is independently selected from the group consisting of hydrogen and optionally substituted hydrocarbyl or heteroatom-containing hydrocarbyl; optionally two or more R⁴⁰ groups may be joined into a ring structure having from 3 to 50 atoms in the ring structure (not counting hydrogen atoms), z' is an integer from 1 to 10, and z'' is 0, 1 or 2.

13. The method of paragraph 9 or 10, wherein T is selected from the group consisting of: —(CH₂)₂—, —(CH₂)₃—, —(CH₂)₄—, and —(CH₂)—(C₆H₄)—(CH₂)—.

14. The method of any of paragraphs 9 to 13, wherein M is zirconium.

15. The method of any of paragraphs 9 to 14, wherein X, X', Y² and Y³ are oxygen.

16. The method of any of paragraphs 9 to 15 wherein L is halogen, preferably chloride.

17. The method of any of paragraphs 9 to 16 where n is 2.

18. The method of paragraph 9 where in the metal complex is selected from the group consisting of:

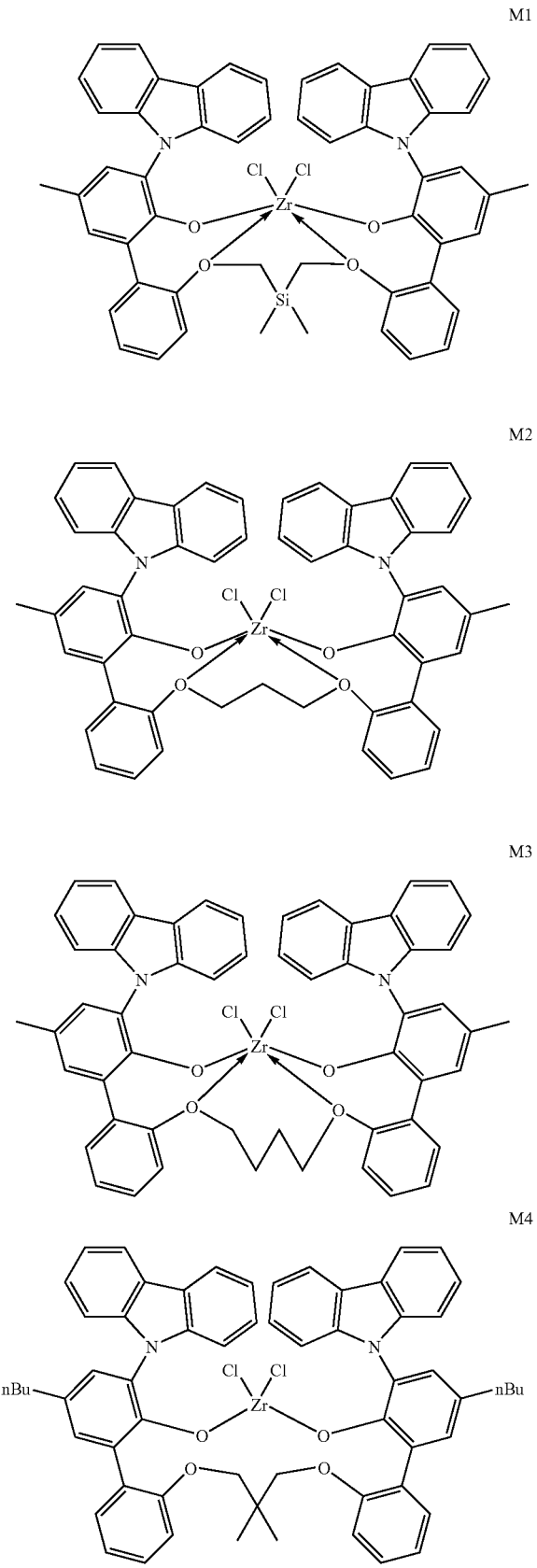

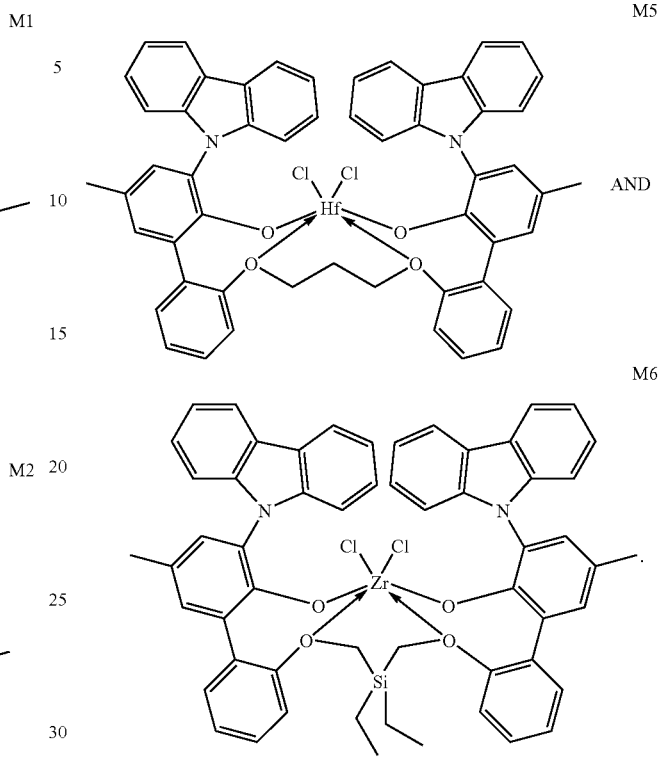

19. The method of any of paragraphs 9 to 18, wherein the method is a solution process operated under polymerization conditions that comprise a temperature above 70° C., more preferably above 100° C., more preferably above 110° C., more preferably above 130° C.

EXAMPLES

General: All air sensitive reactions were performed under a purified argon or nitrogen atmosphere in a Vacuum Atmospheres or MBraun glove box. All solvents used were anhydrous, de-oxygenated and purified according to known techniques. All ligands and metal precursors were prepared according to procedures known to those of skill in the art, e.g., under inert atmosphere conditions, etc. Ethylene/cyclopentene copolymerizations were carried out in a parallel pressure reactor, which is described in U.S. Pat. Nos. 6,306,658, 6,455,316 and 6,489,168, and WO 00/09255, each of which is incorporated herein by reference.

High temperature Size Exclusion Chromatography was performed using an automated "Rapid GPC" system as described in U.S. Pat. Nos. 6,491,816, 6,491,823, 6,475,391, 6,461,515, 6, 436,292, 6,406,632, 6,175,409, 6,454,947, 6,260,407, and 6,294,388 each of which is incorporated herein by reference. In the current apparatus, a series of two 30 cm×7.5 mm linear columns in used, with both columns containing PLgel 10 um, MixB (available from Polymer Labs). The GPC system was calibrated using narrow polystyrene standards. The system was operated at an eluent flow rate of 1.5 mL/min and an oven temperature of 160° C. o-dichlorobenzene was used as the eluent. The polymer samples were dissolved 1,2,4-trichlorobenzene at a concentration of about 5 mg/mL. 200 μL of a polymer solution were injected into the system. The concentration of the polymer in the eluent was monitored using an evaporative light scattering detector. All of the molecular weight results obtained are relative to linear polystyrene standards.

In some embodiments, the ratio of cyclopentene to ethylene incorporated in the copolymer products was determined in some embodiments by Raman spectroscopy. Raman experiments are performed with a commercial spectrometer (JY/Horiba LabRam). The excitation laser is a Nd:YAG laser operating at 532 nm. The beam is focused onto the sample through the objective of a microscope (Olympus BX). The laser spot is focused down such the Raman spectra are collected from individual crystals. The scattered photons are collected at 180 degrees by the same objective. The laser line is removed with a holographic notch filter. The light is then separated with a grating and imaged onto a charged couple device (CCD). The spectra can be collected at a single grating position or the grating can be scanned to collect signal over a larger Raman shift. Data collection ranges from 10 seconds to several minutes depending on the scattering cross section of the sample. In array format, the sample arrays are translated by a three-axis stage. Each well is auto-focused using the hardware auto-focus included in the spectrometer. In order to obtain the best quality spectra, the Z axis if the stage is then translated over a range above and below the initial position; typically plus or minus 50 microns. At a given step size, typically 5 microns, short integration time spectra are collected. Using a known peak, the Z-position that gives the strongest signal is determined. That position is then used for a long integration time spectra that is saved to the database and analyzed. The spectra are analyzed by partial least squares (PLS). Polymers to be analyzed are dissolved in TCB, 40 mg/ml and deposited unto a universal substrate using a liquid handling robot (Cavro) equipped with temperature controlled zones. The solution and robot are maintained at elevated temperature to assure the polymer remains in solution. The temperatures of the components are adjusted to give the best quality films. The solutions are 150° C., the transfer tip at 165° C. and the substrate at 160° C.

In some embodiments, the ratio of cyclopentene to ethylene incorporated in the copolymer products was determined in some embodiments by NMR. NMR spectra were measured on a Bruker ADVANCE DPX 300 MHz NMR. Chemical shifts were referenced to the solvent signals of tetrachloroethane-$d_2$ ($\delta$=74.0 for $^{13}$C). Qualitative $^{13}$C NMR were measured at 90° C. using a modified DEPT60 pulse sequence with a 10 second delay.

Differential Scanning Calorimetry (DSC) measurements were performed on a TA instrument DSC 2920 to determine the glass transition temperature of polymers. 10-20 mg of polymer were deposited as a 40 mg/mL solution in dichlorobenzene into an Aluminium substrate and dried over night in a vacuum oven. The sample was initially ramped with a rate of 10° C. per minute to 200° C. and held for 10 minutes. The sample was then cooled with a rate of 10° C. per minute to −50° C. and data were collected during the cooling period. The sample was held at −50° C. for 4 minutes. Then, the sample was heated to 200° C. at a rate of 10° C./min and data were collected during that heating period.

Figure 2:
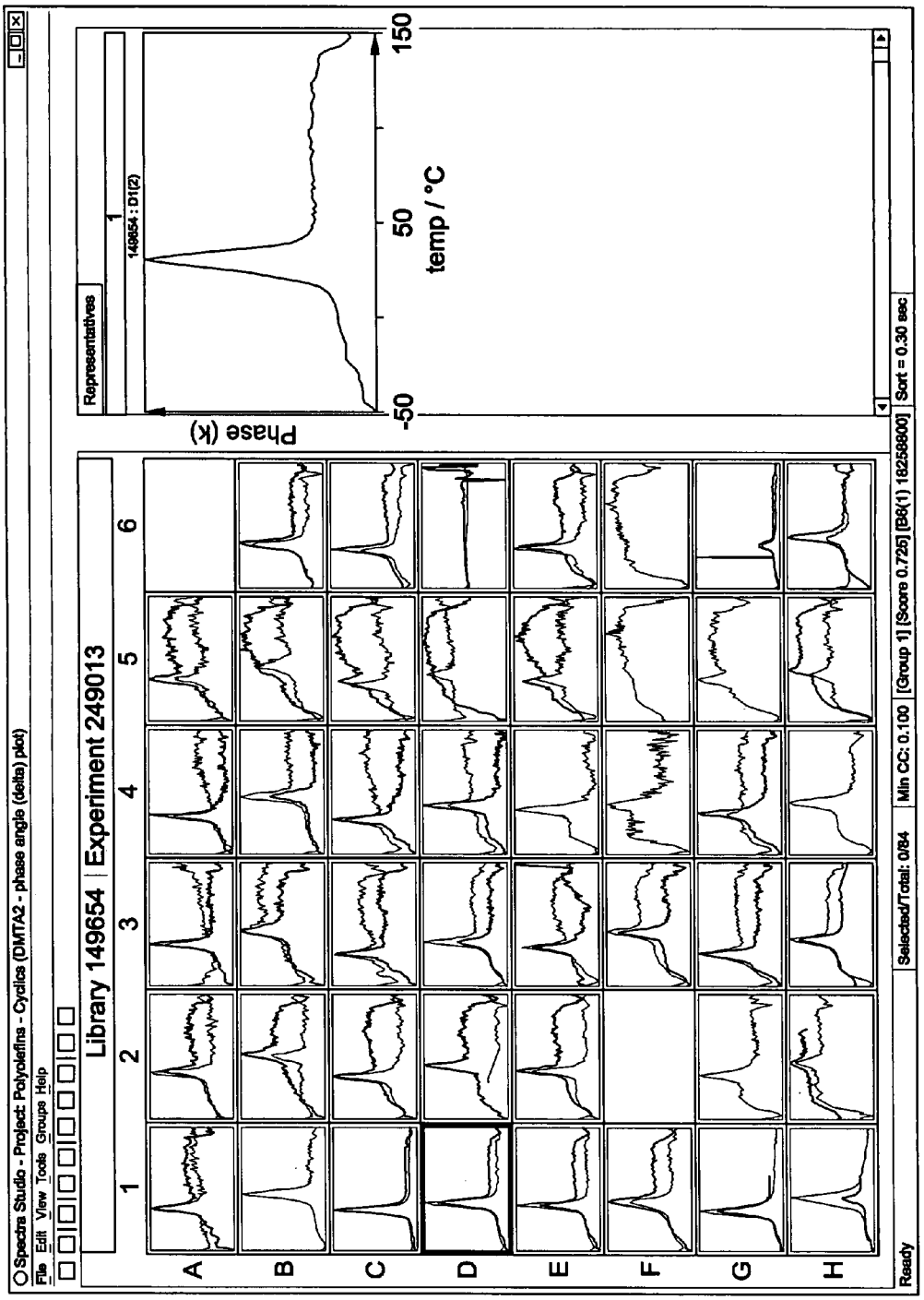
FIG. 2 is a typical output from the Symyx Parallel DMTA showing glass transition points for polymer samples.

Glass transition temperatures, Tg, are determined in some embodiments using the Symyx Parallel DMTA, which has been previously described in detail, see, e.g., U.S. Pat. No. 6,664,067, incorporated herein by reference. The Symyx Parallel DMTA measures the modulus of 96 samples simultaneously as a function of frequency, temperature or time. The actual modulus that is measured is a flexural, or bending, modulus. The measurement itself does not yield a modulus value; the output of the force sensor is actually stiffness. The modulus is easily calculated from the stiffness. A flexible membrane, polyimide film (~50 microns), is used as a support for the polymer samples across the entire plate. The DMTA polyimide substrate consists of ~50 micron Kapton film preprinted with adhesive in a pattern that leaves 5 mm circles without adhesive in an 8×12 array so that it can be firmly attached to an aluminum plate without having any adhesive in the sample zone. The stiffnesses of the unassembled substrates are measured by the DMTA prior to deposition. Polymers to be analyzed are dissolved in trichlorobenzene, (at a concentration of 40 mg/ml) and deposited onto a DMTA substrate using a liquid handling robot (Cavro) equipped with temperature controlled zones. The solution and robot are maintained at elevated temperature to assure the polymer remains in solution. The temperatures of the components are adjusted to give the best quality films. The solutions are at 150° C., the transfer tip at 165° C. and the DMTA substrate at 160° C. The procedures are controlled by Symyx Renaissance® Software (Epoch™ available from Symyx Technologies, Inc., Santa Clara, Calif.). The thickness of the polymer films are determined by confocal laser profilometer (using a Keyence LT-8110) the height profile of the substrate is measured and fit to a square wave. The height of the square wave is the thickness of the film. The stiffness of prepared substrate as a function of temperature is measured in the DMTA. The temperature is swept from approximately −50° C. to approximately 150° C. at a rate of 1° C./minute. Phase transitions, like Tg, are observed in a plot of tan $\delta$ versus temperature, where tan $\delta$ is the ratio of the loss (E") and storage (E') components of the elastic modulus, tan $\delta$=E"/E'. The transitions appear as a peak. Similarly, stiffness can also be used. The phase transitions appear as peaks in phase (k) (the ratio of the loss (E") and storage (E') components of the stiffness). During the experiment, Epoch™ calculates and saves to the database values for storage (E') and loss (E") components of the elastic modulus as a function temperature. The analogous values for the raw stiffness are also calculated and can be viewed. In FIG. 2, the phase (k) as a function of temperature is shown for a typical library of ethylene-cyclopentene copolymers. The library is in an 8×6 format. The 96 well format of the substrate is utilized by depositing each well twice on the substrate, and both data sets are displayed in the appropriate well. The value for Tg corresponds to the maximum of the peaks in phase (k).

Abbreviations used below include: MOMCl is methoxymethyl chloride, DIEA is diisopropylethyl amine, THF is tetrahydrofuran, Cbz-His carbazole, CuI is copper iodide, DMF is dimethylformamide, NMP is N-methylpyrrolidone, TLC is thin layer chromatography, EtOAc is ethyl acetate, Bz is benzyl, and OMOM is methoxymethyl ether.

Example 1

Ligand and Metal Complex Synthesis

General Synthesis Schemes for L1:

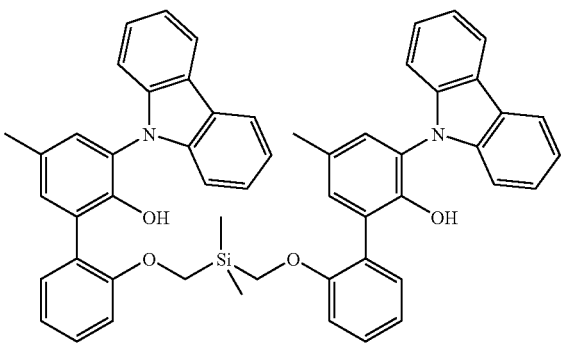

25
Synthesis of Upper Ring Building Block:
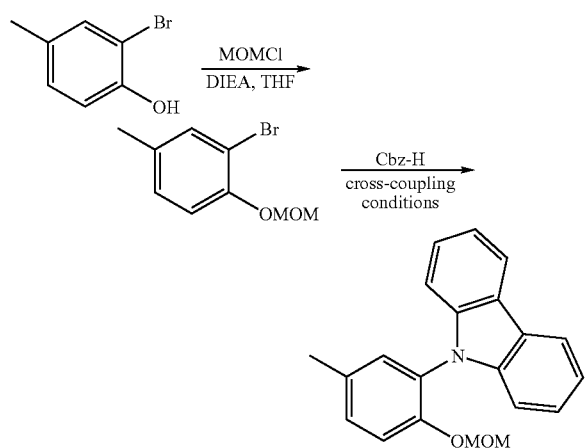
26
Synthesis of Bridged Lower Ring Dibromide Building Block:
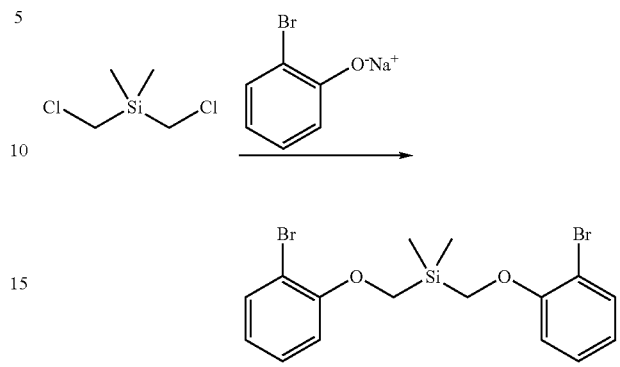
Double Nezishi Coupling of Upper and Lower Ring Building Blocks:
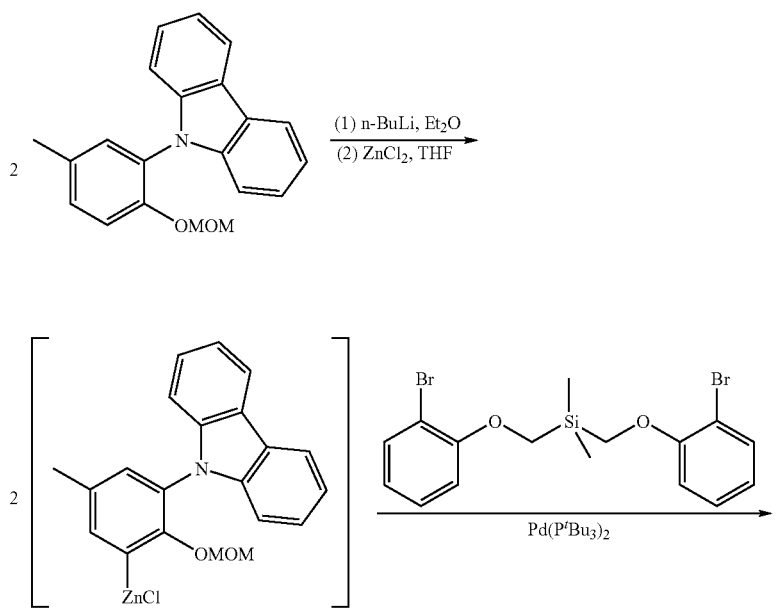
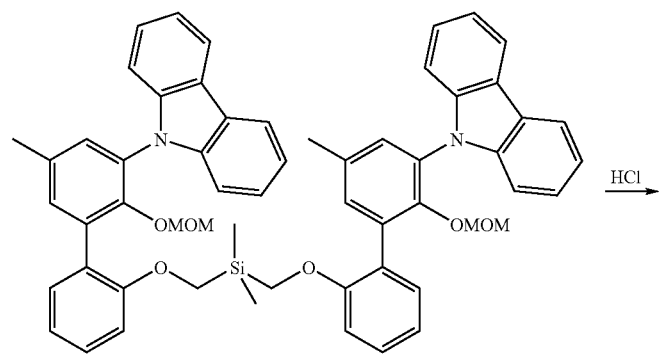

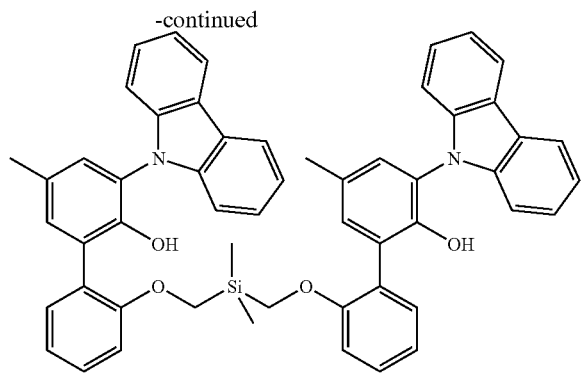

Detailed Synthesis Experimental

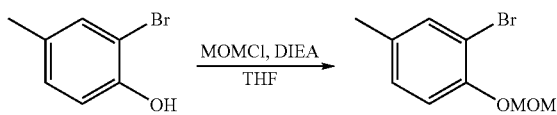

2-bromo-4-methylphenol (11 mmol, 1.0 eq) was taken up in dry THF (20 mL) under an atmosphere of nitrogen and cooled to 0° C. DIEA (2.8 mL, 16 mmol, 1.5 eq) was added followed by dropwise addition of MOMCl (1.2 mL, 16 mmol, 1.5 eq). The reaction was allowed to stir and warm to room temperature over 18 h. THF was removed and the crude material redissolved in EtOAc and washed with 2 M NaOH and water. The organic layer was dried over $Na_2SO_4$ and the crude material purified by flash chromatography (Biotage FLASH 40M KP-Sil silica, 4% $Et_2O$ in hexane) to yield 2.12 g (86%) of the desired product as a viscous clear oil. $^1H$ NMR ($CD_2Cl_2$, 300 MHz): 7.36 (d, J=1.4 Hz, 1H), 7.10-6.97 (m, 2H), 5.18 (s, 2H), 3.49 (s, 3H), 2.27 (s, 3H).

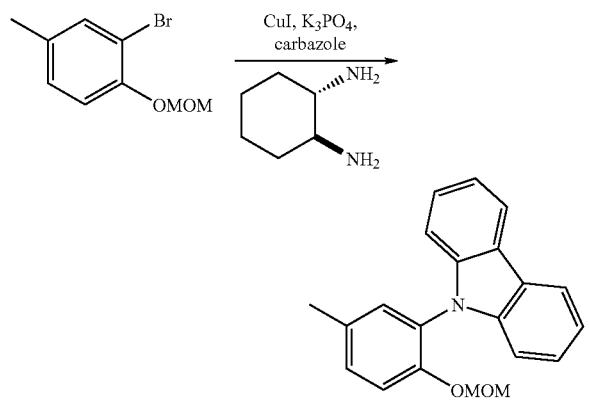

MOM protected bromophenol (1.4 mmol, 1.0 eq) was taken up in dry dioxane (1.4 mL) under an atmosphere of nitrogen. Carbazole (0.29 g, 1.7 mmol, 1.2 eq), copper iodide (27 µg, 0.14 mmol, 10 mol %), racemic trans-1,2-diaminocyclohexane (33 mg, 0.29 mmol, 20 mol %), and $K_3PO_4$ (0.64 g, 3.0 mmol, 2.1 eq) were added and the reaction heated at 110° C. for 22 h. The reaction was diluted with $CH_2Cl_2$ and filtered. The crude material was purified by flash chromatography (Biotage FLASH 40S KP-Sil silica, 5% $Et_2O$ in hexane) to yield 0.24 g (53%) of the desired product as an off-white solid. $^1H$ NMR ($CD_2Cl_2$, 300 MHz): 8.14 (d, J=6.9 Hz, 2H), 7.39 (dt, J=5.4 Hz, J=0.9 Hz, 2H), 7.32-7.23 (m, 4H), 7.17 (d, J=8.1 Hz, 2H), 4.94 (s, 2H), 3.15 (s, 3H), 2.39 (s, 3H).

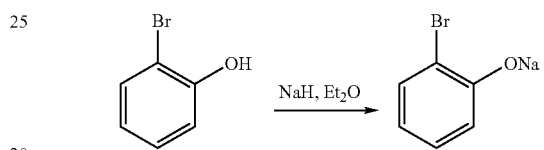

NaH (60% dispersion in mineral oil, 0.46 g, 12 mmol, 1.0 eq) was suspended in dry $Et_2O$ (10 mL) and cooled to 0° C. in an ice/water bath. The appropriate bromophenol (12 mmol, 1.0 eq) was added dropwise to the solution and solvent removed once $H_2$ evolution ceased. The phenoxide was then washed twice with dry hexane and dried prior to use.

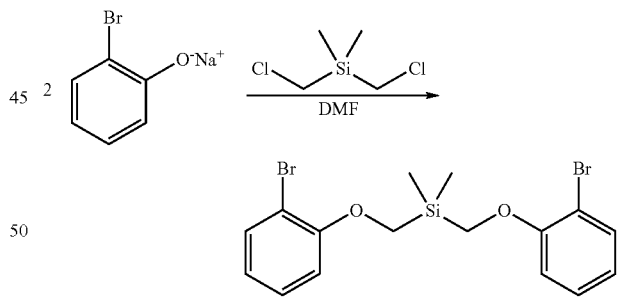

Bis(chloromethyl)dimethylsilane (0.16 g, 1.00 mmol, 1.0 eq) was taken up in DMF (5 mL) and sodium phenoxide (0.40 g, 2.05 mmol, 2.1 eq) was added. The reaction was heated at 50° C. for 18 h. After cooling to room temperature, the reaction was diluted with $CH_2Cl_2$ and washed with $H_2O$. The organic extracts were dried over $Na_2SO_4$, filtered, and concentrated. The crude material was purified by flash chromatography (0-10% $Et_2O$) to give the bridged lower ring dibromide in a 45% yield. $^1H$ NMR ($CD_2Cl_2$, 300 MHz): 7.50 (dd, J=7.8 Hz, J=1.5 Hz, 2H), 7.28 (dt, J=8.4 Hz, J=1.5 Hz, 2H), 7.05 (dd, J=8.4 Hz, J=1.5 Hz, 2H), 6.81 (dt, J=7.8 Hz, J=1.5 Hz, 2H), 3.88 (s, 4H), 0.37 (s, 6H).

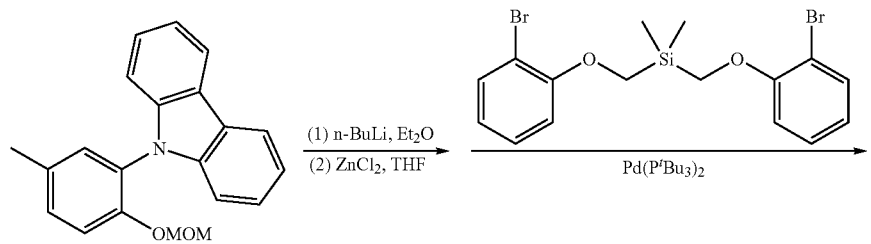

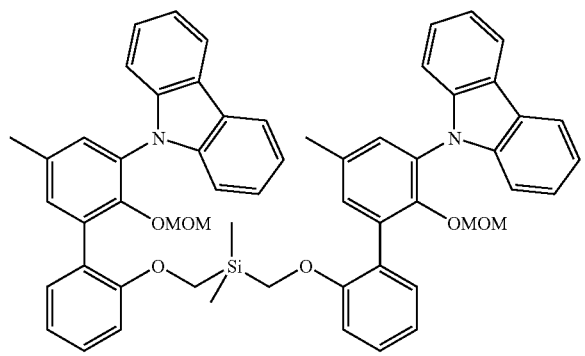

Upper ring building block (0.18 mmol, 2.2 eq) was taken up in dry Et$_2$O (2 mL) under an atmosphere of nitrogen and n-BuLi (1.6 M solution in hexane, 0.12 mL, 0.18 mmol, 2.2 eq) was added dropwise at room temperature. After the mixture had stirred at room temperature for 18 h, a solution of ZnCl$_2$ (0.5 M in THF, 0.37 mL, 0.18 mmol, 2.2 eq) was added dropwise and stirring continued for 30 min. Solvent was then removed and the residue redissolved in 3:1 THF/NMP (2 mL). Bridged lower ring dibromide (83 μmol, 1.0 eq) and Pd(P$^t$Bu$_3$)$_2$ (1.7 mg, 3.0 μmol, 4 mol %) were added and the reaction heated at 80° C. for 2 h. The reaction was cooled to room temperature and THF was removed. The residue was diluted with CH$_2$Cl$_2$, washed with 1 M HCl, and dried over Na$_2$SO$_4$. The crude material was purified by flash chromatography (0-15% Et$_2$O/hexane) to give the desired product in an 84% yield. $^1$H NMR (CD$_2$Cl$_2$, 300 MHz): 8.11 (d, J=7.5 Hz, 4H), 7.42-7.15 (m, 20H), 7.00-6.85 (m, 4H), 4.05 (s, 4H), 3.66 (s, 4H), 2.35 (s, 6H), 2.14 (s, 6H), 0.11 (s, 6H).

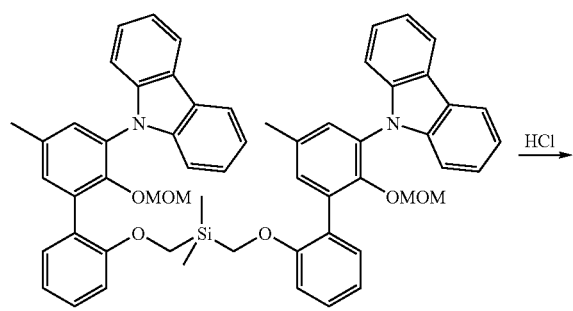

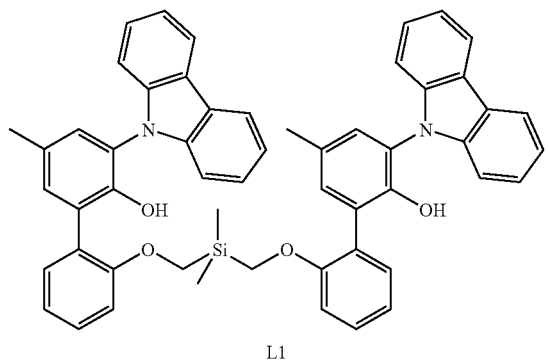

L1

In a typical procedure, the protected ligand (0.14 mmol) was taken up in THF (1.8 mL). MeOH (0.9 mL) was added to the solution followed by concentrated HCl (10 drops). Additional THF (0.5 mL) was added if the solution became cloudy. The reaction was allowed to stir at room temperature and was monitored by TLC (alumina plates, typically 50% Et$_2$O in hexane) for completion. After approximately 18 h, the solvent was removed and the residue was dissolved in CH$_2$Cl$_2$ and washed with NaHCO$_3$. (The reaction was heated at 40° C. if deprotection was not complete after 18 h.) The organic extracts were dried over Na$_2$SO$_4$, filtered, and concentrated. The crude material was purified by flash chromatography (0-10% EtOAc/hexane) to give the desired product in a 51% yield. $^1$H NMR (CD$_2$Cl$_2$, 300 MHz): 8.17 (d, J=7.2 Hz, 4H), 7.40-6.90 (m, 22H), 6.37 (d, J=8.4 Hz, 2H), 5.64 (s, 2H), 3.41 (s, 4H), 2.36 (s, 6H), −0.15 (s, 6H).

Preparation of L2-L5

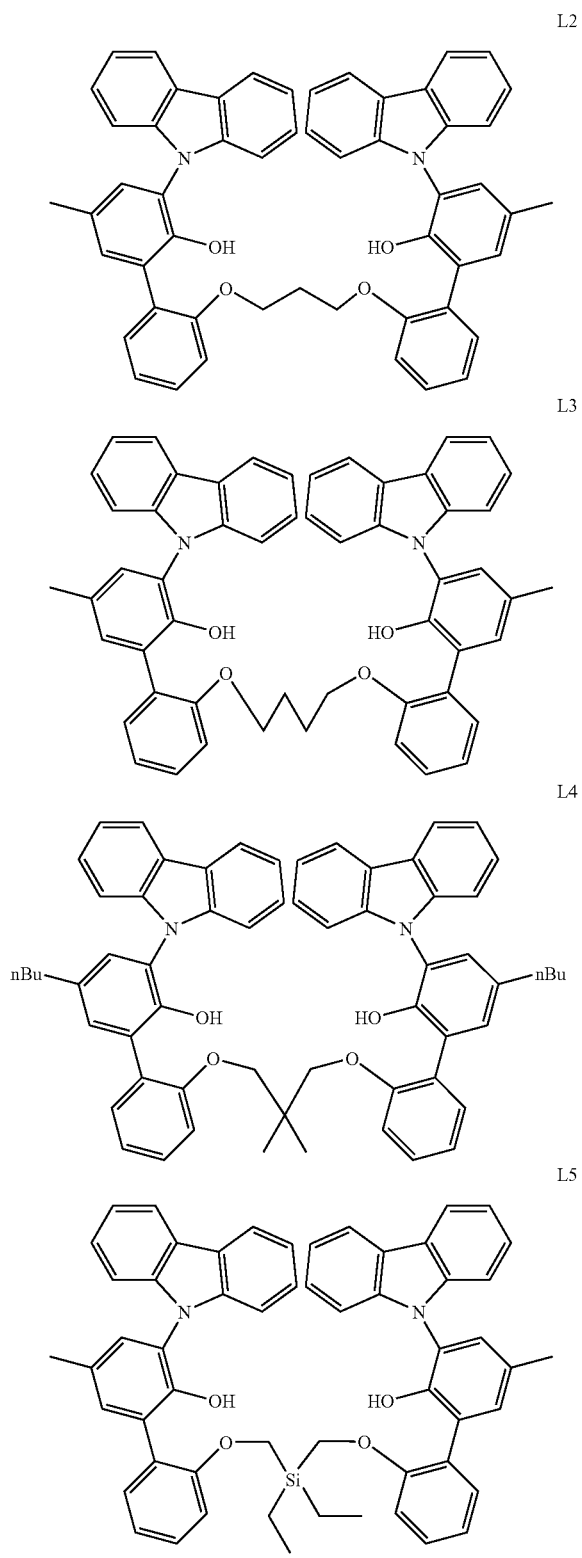

Ligands L2, L3, L4 and L5 shown above, are prepared in a manner similar to L1, and as shown in U.S. Pat. No. 6,869,904 and PCT/US2005/014670, both of which are incorporated herein by reference.

Preparation of Metal Complexes

Preparation of M1

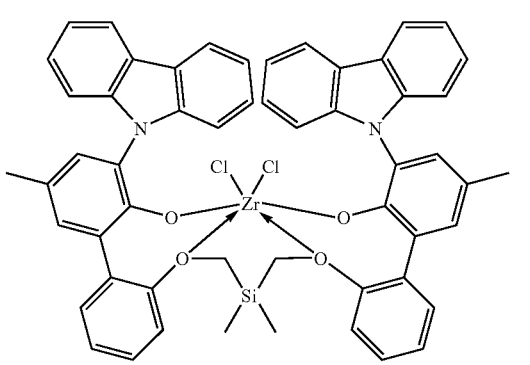

In a glovebox under an atmosphere of argon, 151 mg (0.35 mmol) $ZrCl_2Bz_2(Et_2O)_{1.2}$ was dissolved in ca. 5 mL toluene. 281 mg (0.35 mmol) of L1 was dissolved in ca. 15 mL toluene. The solution of $ZrCl_2Bz_2(Et_2O)_{1.2}$ was added to the stirred solution of the ligand and the reaction mixture was heated to 80° C. for 1.5 hours. The reaction mixture was concentrated to 1.5 mL stored at the freezer at −35° C. overnight, yielding a slightly grey precipitate (243 mg). The precipitate was collected, washed with 5 mL hexane, and dried. A second crop (44 mg) was obtained by combining the supernatant and hexane washings, reducing the volume to 0.5 mL, and storing at −35C for 3 days. The resulting microcrystalline precipitate was collected. (Total yield: 85%). $^1$H NMR ($CCl_2D_2$, 300 MHz): 8.41 (d), 8.15 (d), 7.5-7.1 (m), 6.82 (t), 4.80 (d), 4.48 (d), 3.45 (d), 2.43 (s), −0.36 (s).

Preparation of M2

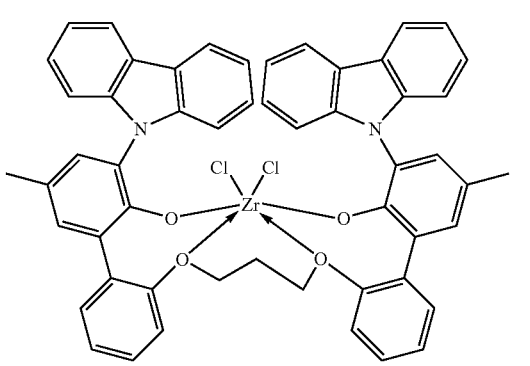

M2 was prepared from L2 and $ZrCl_2Bz_2(Et_2O)_{1.2}$ in a manner similar to that described for M1, above.).

Preparation of M3

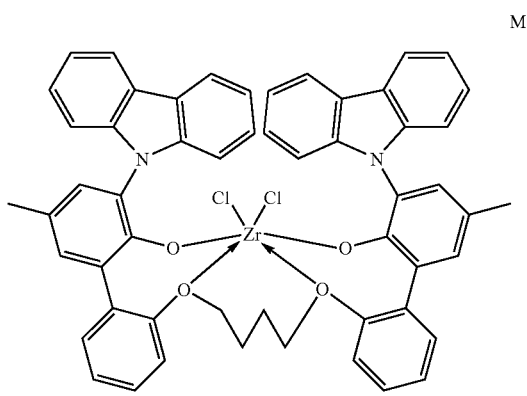

M3 was prepared from L3 and ZrCl$_2$Bz$_2$(Et$_2$O)$_{1.2}$ in a manner similar to that described for M1, above.

Preparation of M4

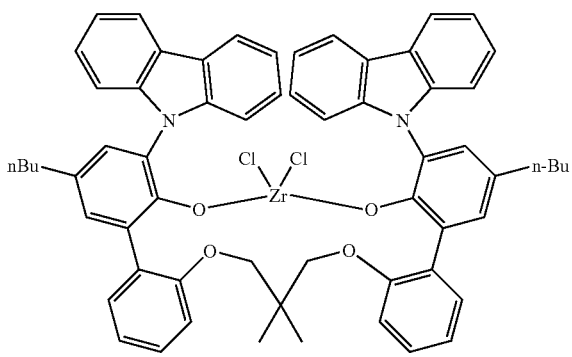

M4 was prepared from L4 and ZrCl$_2$Bz$_2$(Et$_2$O)$_{1.2}$ in a manner similar to that described for M1, above.

Preparation of M5

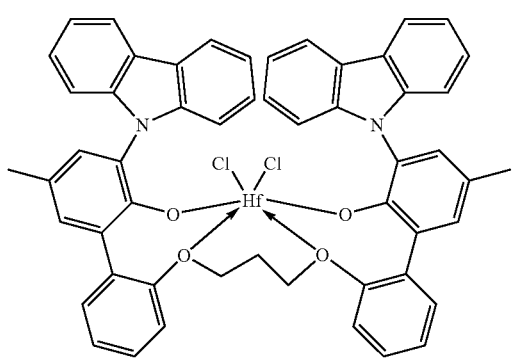

M5 was prepared from L2 and HfCl$_2$Bz$_2$(Et$_2$O)$_{1.2}$ in a manner similar to that described for M1, above.

Preparation of M6

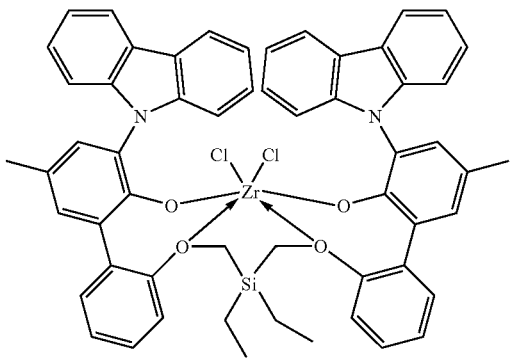

M6 was prepared from L5 and ZrBz$_2$Cl$_2$(Et$_2$O)$_{1.2}$ in a manner similar to that described for M1.

Example 2

Ethylene/cyclopentene Copolymerizations using Isolated Complexes

Preparation of the Polymerization Reactor Prior to Injection of Catalyst composition: A pre-weighed glass vial insert and disposable stirring paddle were fitted to each reaction vessel of the reactor. The reactor was then closed, 0.400 mL of a 0.05 M solution of Modified Methylaluminoxane 3A (from Azko Chemical Inc., Chicago, Ill.) ("MMAO-3A") in toluene, 3.00 mL of cyclopentene and 0.600 mL of toluene were injected into each pressure reaction vessel through a valve. The temperature was then set to the appropriate setting (the specific temperatures for each polymerization are listed in Table 1, below), and the stirring speed was set to 800 rpm, and the mixture was exposed to ethylene (the specific pressure for each example is listed in Table 1, below). The pressure and the temperature setting were maintained, using computer control, until the end of the polymerization experiment, which was accomplished by introducing carbon dioxide by overpressure.

Activation method and injection of solutions into the pressure reactor vessel: The following methods were employed to activate and inject the isolated complexes as indicated in Table 1. Method A: 120 µL of a 0.050M solution of the MMAO-3A in toluene was dispensed into a 1 mL vial. 100 µL of the metal complex solution (3.0 mM in chlorobenzene) containing 0.3 µmol metal complex was then added to the 1 mL vial. After about 10 min, 150 µL of a solution of MMAO-3A in toluene (0.400 M) was added to the 1 mL vial and the contents of the 1 mL vial were mixed. About another 70 seconds later a fraction of the total 1 mL vial contents containing the indicated "µmol catalyst injected" in Table 1, based on micromoles (µmol) of metal complex, was injected into the pre-pressurized reaction vessel and was followed immediately by injection of toluene to increase the total volume injected to 0.500 mL. Method B: 45 µL of a 0.200M solution of triisobutyl aluminium ("TIBA") in toluene was dispensed into a 1 mL vial. 100 µL of the metal complex solution (3.0 mM in chlorobenzene) containing 0.3 µmol metal complex was added to the 1 mL vial. After about 10 min, 150 µL of a solution of MMAO-3A in toluene (0.600 M) was added to the 1 mL vial and the contents of the 1 mL vial were mixed. About another 70 seconds later a fraction of the total 1 mL vial contents containing the indicated "µmol catalyst injected" in Table 1, based on micromoles (µmol) of metal complex, was injected into the pre-pressurized reaction vessel and was followed immediately by injection of toluene to increase the total volume injected to 0.500 mL.

Product work up: After the polymerization reaction, the glass vial insert, containing the polymer product and solvent, was removed from the pressure cell and removed from the inert atmosphere dry box, and the volatile components were removed using a centrifuge vacuum evaporator. After most of the volatile components had evaporated, the vial contents were dried thoroughly by evaporation at elevated temperature under reduced pressure. The vial was then weighed to determine the yield of polymer product. The polymer product was then analyzed by rapid GPC, as described above to determine the molecular weight of the polymer produced, and by Raman spectroscopy to determine the mole percent cyclopentene incorporated in the polymer. The glass transition temperature of selected samples was measured by DSC or DMTA, as described above. $^{13}$C NMR was taken of samples of polymer prepared in Examples P1 and P3, which are shown in FIG. 1. FIG. 1 shows the NMR peak assignments for 1,2 insertion of the cyclopentene monomer into the backbone of the copolymer, with back to back 1,2 insertion of the cyclopentene monomer shown in Example P1 and 1,2 insertion of cyclopentene next to ethyl shown in Example P3. The NMR's in FIG. 1 also show less than 1% of 1,3 insertion based on the absence of peaks in the 35-30 ppm region.

thereby. Likewise, the term "comprising" is considered synonymous with the term "including" for purposes of Australian law.

What is claimed is:

1. A copolymer of ethylene and cyclopentene, wherein said cyclopentene monomer is incorporated in said copolymer is present in an amount greater than 50 mole percent, and wherein said cyclopentene is incorporated into the backbone of the copolymer via a cis 1,2 insertion without substantially any 1,3 insertion.

2. The copolymer of claim 1, wherein less than 3 percent of the cyclopentene is incorporated into the copolymer via 1,3 insertion.

3. The copolymer of claim 1, wherein less than 10 percent of the cyclopentene is incorporated into the copolymer via 1,3 insertion.

4. The copolymer of claim 1, wherein less than 50 percent of the cyclopentene is incorporated into the copolymer via 1,3 insertion.

5. The copolymer of claim 1, wherein less than 70 percent of the cyclopentene is incorporated into the copolymer via 1,3 insertion.

6. A copolymer of ethylene and cyclopentene, wherein said cyclopentene monomer is incorporated in said copolymer is present in an amount greater than 50 mole percent, and wherein said cyclopentene is incorporated into the backbone of the copolymer via a cis 1,2 insertion without 1,3 insertion.

TABLE 1

| Example # | Metal Complex | Activation Method | Psi Total Pressure | Polymerization Temp(° C.) | µmol catalyst injected | Polymerization time (s) | Activity (gpolymer/min*mmol) |
|---|---|---|---|---|---|---|---|
| P1 | M1 | A | 65 | 100 | 0.06 | 600 | 203 |
| P2 | M1 | A | 80 | 100 | 0.06 | 270 | 682 |
| P3 | M1 | A | 100 | 100 | 0.06 | 130 | 1717 |
| P4 | M1 | B | 140 | 120 | 0.025 | 172 | 2302 |
| P5 | M1 | B | 175 | 140 | 0.025 | 173 | 1037 |
| P6 | M2 | B | 140 | 120 | 0.025 | 172 | 2350 |
| P7 | M3 | B | 140 | 120 | 0.015 | 205 | 2894 |
| P8 | M4 | B | 140 | 120 | 0.08 | 118 | 1505 |

| Example # | Mw (kg) | PDI (Mw/Mn) | Mol % cyclopentene by Raman | Mol % cyclopentene by $^{13}$C NMR | T$^g$(DSC) | T$^g$(DMTA) |
|---|---|---|---|---|---|---|
| P1 | 25 | 4.9 | 63 |  | 60 |  |
| P2 | 61 | 3.9 | 57 |  | 45 |  |
| P3 | 88 | 3.4 | 53 |  |  |  |
| P4 | 65 | 1.6 | 47 |  |  | 35 |
| P5 | 38 | 1.6 | 51 | 48 |  | 40 |
| P6 | 52 | 1.6 | 47 |  |  | 33 |
| P7 | 83 | 1.7 | 47 |  |  | 30 |
| P8 | 11 | 1.2 | 55 |  |  |  |

A number of embodiments of the invention have been described. Nevertheless, it will be understood that various modifications may be made without departing from the spirit and scope of the invention. Accordingly, other embodiments are within the scope of the following claims. All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited 7. A copolymer of ethylene and cyclopentene, wherein said cyclopentene monomer is incorporated in said copolymer is present in an amount greater than 50 mole percent; and wherein said copolymer has a glass transition temperature of greater than 30° C.

8. A copolymer of ethylene and cyclopentene, wherein said cyclopentene monomer is incorporated in said copolymer is present in an amount greater than 50 mole percent; and wherein said copolymer has a glass transition temperature of greater than 35° C.

9. A copolymer of ethylene and cyclopentene, wherein said cyclopentene monomer is incorporated in said copolymer is present in an amount greater than 50 mole percent; and wherein said copolymer has a glass transition temperature of greater than 40° C.

10. A method to produce a copolymer of claim 1, comprising reacting ethylene and cyclopentene in the presence of a catalyst under conditions sufficient to yield said copolymer, wherein said catalyst is made from one or more activators and a metal complex characterized by the general formula:

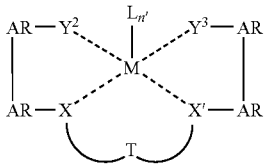

wherein at least two of the bonds from $Y^2$, $Y^3$, X and X' to M are covalent, with the other bonds being dative; AR is an aromatic group that can be the same or different from the other AR groups with each AR being independently selected from the group consisting of optionally substituted aryl or heteroaryl; X, X', $Y^2$, and $Y^3$ are independently selected from the group consisting of oxygen, sulfur, $-N(R^{30})_r-$, and $-P(R^{30})_r-$, and optionally substituted alkoxy, aryloxy, alkylthio, and arylthio, where $R^{30}$ is selected from the group consisting of hydrogen, halogen, and optionally substituted hydrocarbyl, heteroatom-containing hydrocarbyl, silyl, boryl, alkoxy, aryloxy and combinations thereof, and r is 0 or 1;

T is a bridging group;

M is a metal selected from groups 3-6 and lanthanide elements of the periodic table of elements;

each L is independently a moiety that forms a covalent, dative or ionic bond with M; and n' is 1,2, 3 or 4.

11. The method of claim 10, wherein the group X-T-X' is selected from the group consisting of

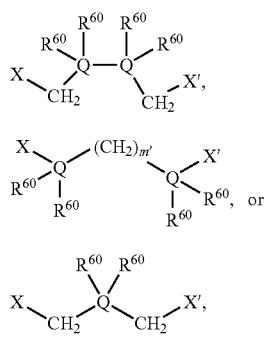

wherein X, X', are as defined in claim 10 and each Q is independently selected from the group consisting of carbon and silicon, each $R^{60}$ is independently selected from the group consisting of hydrogen and optionally substituted hydrocarbyl and heteroatom containing hydrocarbyl, wherein the $R^{60}$ are optionally joined into a ring structure having from 3 to 50 atoms in the ring structure not counting hydrogen atoms, and m' is 0, 1, or 2; provided that at least one $R^{60}$ is not hydrogen; and provided that when X-T-X' is selected from formula (b) at least one $R^{60}$ on each Q is not hydrogen.

12. The method of claim 10, wherein T is represented by the general formula:
$-(Q''R^{40}_{2-z''})_{z'}-$ wherein each Q" is independently either carbon or silicon and where each $R^{40}$ is independently selected from the group consisting of hydrogen and optionally substituted hydrocarbyl or heteroatom-containing hydrocarbyl; optionally two or more $R^{40}$ groups may be joined into a ring structure having from 3 to 50 atoms in the ring structure (not counting hydrogen atoms), z' is an integer from 1 to 10, and z" is 0, 1 or 2.

13. The method of claim 10, wherein M is a metal selected from group 4.

14. The method of claim 10, wherein L is halogen.

15. The method of claim 10, wherein said cyclopentene is incorporated into the backbone of the copolymer via a cis 1,2 insertion without 1,3 insertion.

16. The method of claim 10, wherein said copolymer has a glass transition temperature of greater than 30° C.

17. The method of claim 10, wherein said copolymer has a glass transition temperature of greater than 35° C.

18. The method of any of claim 10, wherein said copolymer has a glass transition temperature of greater than 40° C.

19. The method of claim 10, wherein the metal complex is characterized by the general formula:

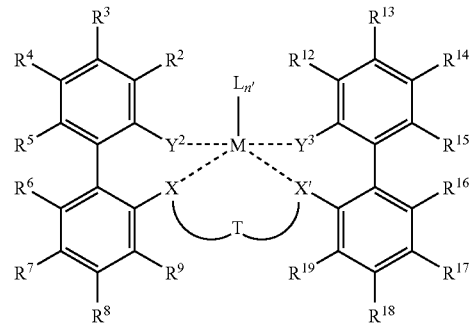

wherein T, M, L, n', X, X', $Y^2$ and $Y^3$ are as defined in claim 10, and each of $R^2$, $R^3$, $R^4$, $R^5$, $R^6$, $R^7$, $R^8$, $R^9$, $R^{12}$, $R^{13}$, $R^{14}$, $R^{15}$, $R^{16}$, $R^{17}$, $R^{18}$, and $R^{19}$ is independently selected from the group consisting of hydrogen, halogen, nitro, and optionally substituted hydrocarbyl, heteroatom-containing hydrocarbyl, alkoxy, aryloxy, silyl, boryl, phosphino, amino, alkylthio, arylthio, and combinations thereof; optionally two or more R groups can combine together into ring structures, with such ring structures having from 3 to 100 atoms in the ring not counting hydrogen atoms.

20. The method of claim 10, wherein the method is a solution process operated under polymerization conditions that comprise a temperature of at least 70° C.

21. The method of claim 10, wherein the method is a solution process operated under polymerization conditions that comprise a temperature of at least 100° C.

22. The method of claim 10, wherein M is Zr, n is 2, and each L is halogen and X, X', $Y^2$ and $Y^3$ are oxygen.

23. The method of claim 10, wherein T is selected from the group consisting of: $-(CH_2)_2-$, $-(CH_2)_3-$, $-(CH_2)_4-$, and $-(CH_2)-(C_6H_4)-(CH_2)-$.

24. The method of claim 10, wherein M is zirconium.

25. The method of claim 10, wherein X, X', $Y^2$ and $Y^3$ are oxygen.

26. The method of claim 10, wherein each L is chloride.

27. The method of claim 10, where n' is 2.

28. The method of claim 10, wherein the metal complex is selected from the group consisting of:
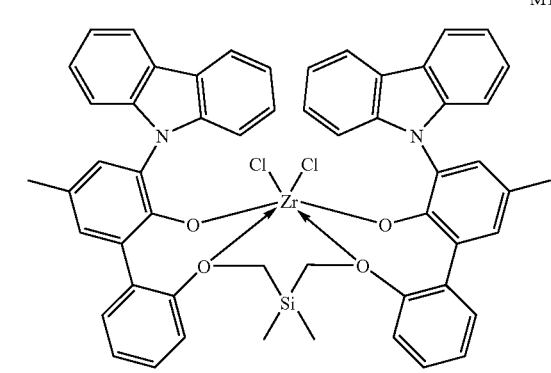
M1
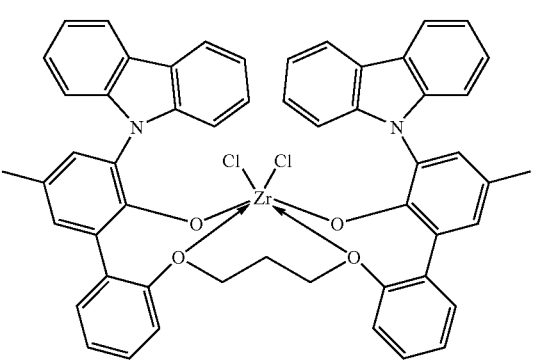
M2
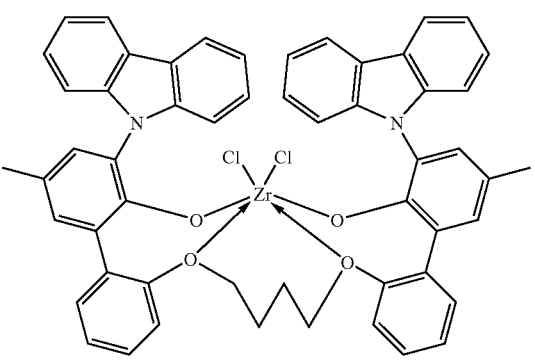
M3
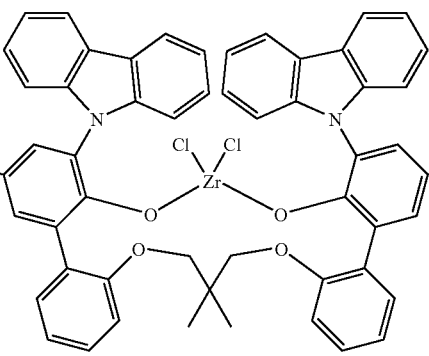
M4
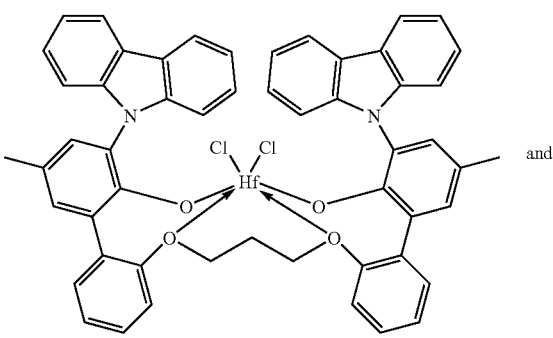
M5
and
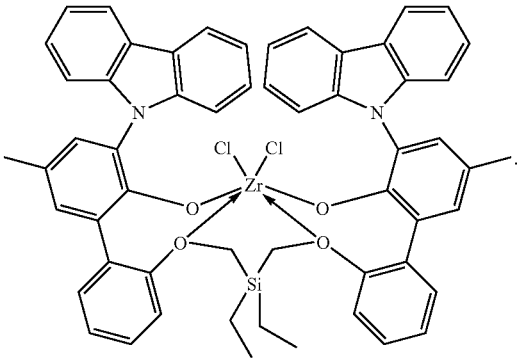
M6
.
* * * * *